US011496332B2

(12) United States Patent
Sullivan

(10) Patent No.: US 11,496,332 B2
(45) Date of Patent: *Nov. 8, 2022

(54) CHANNELING MESSAGING COMMUNICATIONS IN A SELECTED GROUP-BASED COMMUNICATION INTERFACE

(71) Applicant: SLACK TECHNOLOGIES, LLC, San Francisco, CA (US)

(72) Inventor: Christopher Sullivan, San Francisco, CA (US)

(73) Assignee: Salesforce, inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/391,422

(22) Filed: Aug. 2, 2021

(65) Prior Publication Data

US 2021/0359873 A1    Nov. 18, 2021

Related U.S. Application Data

(63) Continuation of application No. 16/985,044, filed on Aug. 4, 2020, now Pat. No. 11,082,247, which is a
(Continued)

(51) Int. Cl.
*H04L 12/18* (2006.01)
*G06F 3/04842* (2022.01)
(Continued)

(52) U.S. Cl.
CPC ...... *H04L 12/1822* (2013.01); *G06F 3/04842* (2013.01); *H04L 51/02* (2013.01);
(Continued)

(58) Field of Classification Search
CPC ... H04L 12/1822; H04L 51/02; H04L 51/046; G06F 3/04886; G06F 3/04842
See application file for complete search history.

(56) References Cited

U.S. PATENT DOCUMENTS 7,426,540 B1 *   9/2008   Matsumoto ......... H04L 12/1822
                                                  709/224
2013/0069969 A1   3/2013   Chang et al.
(Continued)

OTHER PUBLICATIONS

"Die, Email, Die! A Flickr Cofounder Aims to Cut Us All Some Slack", Readwriteweb, Lexisnexis, www.advance.lexis.com/api/permalink/33dd79e2-90f5-409d-ae27-5a2c7e86bf31/?context=1000516. (dated Aug. 14, 2013, 4:15 PM) 2 pages.
(Continued)

*Primary Examiner* — Kyung H Shin
(74) *Attorney, Agent, or Firm* — Holland & Hart LLP

(57) ABSTRACT

Provided is a group-based communication interface configured to allow users of the interface to communicate within group-based communication channels and across group-based communication channels to provide relevant information to other users efficiently and effectively. Group-based messaging communications across the plurality of group-based communication channels can be channeled to specific receiver channels providing relevant information to users of the group-based communication interface thereby increasing the efficiency and effectiveness of group-based messaging communications and the lifetime of the system.

20 Claims, 14 Drawing Sheets

Related U.S. Application Data continuation of application No. 15/730,146, filed on Oct. 11, 2017, now Pat. No. 10,771,270.

(60) Provisional application No. 62/535,082, filed on Jul. 20, 2017.

(51) Int. Cl.
  H04L 51/02 (2022.01)
  H04L 51/04 (2022.01)
  H04M 1/72436 (2021.01)
  H04L 51/42 (2022.01)
  H04L 51/214 (2022.01)
  H04L 51/046 (2022.01)
  G06F 3/04886 (2022.01)

(52) U.S. Cl.
  CPC ............ H04L 51/04 (2013.01); H04L 51/214 (2022.05); H04L 51/42 (2022.05); H04M 1/72436 (2021.01); G06F 3/04886 (2013.01); H04L 51/046 (2013.01)

(56) References Cited

U.S. PATENT DOCUMENTS

| | | | |
|---|---|---|---|
| 2016/0285799 A1* | 9/2016 | Andreev | H04L 51/02 |
| 2018/0287982 A1 | 10/2018 | Draeger et al. | |

OTHER PUBLICATIONS

"How Slack changed the way we work by putting the customer experience first", Repeat Customer Podcast, Episode 3, [online][retrieved May 9, 2019]. Retrieved from the Internet: www.zendesk.com/resources/slack-customer-experience/, (2019) 13 pages.

Adrienne LaFrance, "The Triumph of Email", Atlantic Online, Lexisnexis, www.advance.lexis.com/api/permalink/32d7ddd9-d4c1-4a73-86f7-08ab5842fde6/?context=1000516, (dated Jan. 6, 2016) 5 pages.

David Auberbach, "Re-Animator. How Stewart Butterfield created Flickr and Slack out of the ashes of failed projects" [online][retrieved May 9, 2019]. Retrieved from the Internet: www.slate.com/business/2014/05/stewart-butterfield-flickr-and-slack-how-he-snatched-victory-from-the-jaws-of-defeat.html. (dated May 28, 2014, 2:48 PM) 8 pages.

Ernie Smith, "Picking Up the Slack", TEDIUM, [online][retrieved May 9, 2019]. Retrieved from the Internet: www.tedium.co/2017/10/17/irc-vs-slack-chat-history/. (dated Oct. 17, 2017) 13 pages.

Internet Relay Chat, Wikipedia, [online][retrieved May 30, 2019]. Retrieved from the Internet: www.wikipedia.org/wiki/Internet_Relay_Chat. (dated May 28, 2019) 20 pages.

Jonathan Vanian, "Why these startups think chat apps are the next big thing in workplace collaboration", Gigaom, Lexisnexis, www.advance.lexis.com/api/permalink/e83778c8-09c8~43aa-9ba0-88526283de69/?context=1000516, (dated Aug. 1, 2014, 5:45 PM) 4 pages.

Matsumoto, T. et al., "Chocoa Communicator—A New Communication System Based on Awareness and Text Communications-", Fujitsu Sci. Tech. J., 36, 2, (Dec. 2000) 154-161.

Matthew Ingram, "Flickr co-founder launches Slack, an all-in-one messaging tool designed to kill email forever", Gigaom, Lexisnexis, www.advance.lexis.com/api/permalink/0b676b7c-aec3-4560-861e-d030d1dd008c/?context=1000516, (dated Feb. 12, 2014, 7:03 PM), 2 pages.

Michael Carney, "Slack is thriving on a cocktail of whimsy and great timing", Pandodaily, Lexisnexis, www.advance.lexis.com/api/permalink/dd2d4ee5-2ddf-4d3a-a1d9-3bcee5e38b74/?context=1000516, (dated Feb. 6, 2015, 2:12 AM) 3 pages.

Mike Isaac, "Slack, a Start-Up With an App to Foster Business Collaboration, Is Valued at $1.1 Billion", The New York Times Blogs (Bits), Lexisnexis, www.advance.lexis.com/api/permalink/3eb84b34-a8f9-4d7d-9573-89d9598a4963/?context=1000516. (dated Oct. 31, 2014) 2 pages.

Dikarinen, J. & Reed, D., "Internet Relay Chat Protocol", Request for Comments: 1459, Network Working Group, [online][retrieved May 30, 2019], Retrieved from the Internet: www.rfc-editor.org/rfc/rfc1459.txt. (dated May 1993) 57 pages.

Rebecca Walberg, "Email biggest office waste of time: survey", National Post, At FP10, Lexisnexis, www.advance.lexis.com/api/permalink/96268e3f-26ad-48ac-a98f-6c39804ebded/?context=1000516, (dated Mar. 4, 2014) 2 pages.

Robert Hof, "Stewart Butterfield on How Slack Became a $2.8 Billion Unicorn", Forbes, [online][retrieved May 9, 2019]. Retrieved from the Internet: www.forbes.com/sites/roberthof/2015/06/02/stewart-butterfield-on-how-slack-became-a-2-8-billion-unicorn-2/#7c31937d7d9c. (dated Jun. 2, 2015, 3;25 PM), 3 pages.

Sullivan et al., U.S. Office Action dated Nov. 13, 2020, directed to U.S. Appl. No. 16/985,044; 13 pages.

Sullivan, U.S. Office Action dated Aug. 1, 2019, directed to U.S. Appl. No. 15/730,146; 17 pages.

Sullivan, U.S. Office Action dated Jan. 30, 2020, directed to U.S. Appl. No. 15/730,146; 26 pages.

The Big Pivot w/ Slack's Stewart Butterfield, Masters of Scale Podcast, Episode 13 (Aired Nov. 14, 2017), www.mastersofscale.com/#/stewart-butterfield-the-big-pivot/, (dated Jan. 17, 2018) 27 pages.

* cited by examiner

1000

1002

RECEIVE A CHANNELING REQUEST THAT IS CONFIGURED TO MOVE BETWEEN ONE OR MORE OF THE PLURALITY OF GROUP-BASED COMMUNICATION CHANNELS AFTER DISPLAYING THE CHANNELED COPY WITH THE RECEIVER CHANNEL VIA THE GROUP-BASED COMMUNICATION INTERFACE

1004

DISPLAY ONE OR MORE OF THE PLURALITY OF GROUP-BASED COMMUNICATION CHANNELS VIA THE GROUP-BASED COMMUNICATION INTERFACE INSTEAD OF DISPLAYING THE RECEIVER CHANNEL

FIG. 10

CHANNELING MESSAGING COMMUNICATIONS IN A SELECTED GROUP-BASED COMMUNICATION INTERFACE

CROSS-REFERENCE TO RELATED APPLICATIONS

This application is a continuation of U.S. application Ser. No. 16/985,044, filed on Aug. 4, 2020, which is a continuation of U.S. application Ser. No. 15/730,146, filed Oct. 11, 2017, which claims priority to and the benefit of U.S. Provisional Patent Application No. 62/535,082, entitled "Channeling Messaging Communications In A Selected Group-Based Communication Interface" and filed on Jul. 20, 2017, the entire contents of which are hereby incorporated by reference.

BACKGROUND

Various messaging systems are available that allow users to have continuous conversations electronically between each other. In such systems, one or more users may send messages back and forth discussing various topics. In certain systems, the string of messages may be saved and later accessible to the participants of the conversation. Applicant has identified a number of deficiencies and problems associated with conventional messaging systems. Through applied effort, ingenuity, and innovation, many of these identified problems have been solved by developing solutions that are included in embodiments of the present invention, many examples of which are described in detail herein.

BRIEF SUMMARY

In general, embodiments of the present invention provided herein include methods, apparatus, and computer program products for facilitating a group-based communication interface.

In some example embodiments, a method may be provided including updating a selected group-based communication interface from a plurality of group-based communication interfaces, wherein the selected group-based communication interface may include a plurality of group-based communication channels. The method may further include receiving a channeling association that is configured to establish a connection between a graphical identifier and a receiver channel of the plurality of group-based communication channels; receiving group-based messaging communications to one or more of the plurality of group-based communication channels other than the receiver channel; receiving a correlation indication associating the graphical identifier with a selected messaging communication of the group-based messaging communications; in response to receiving the correlation indication, reproducing the selected messaging communication to create a channeled copy within the receiver channel of the plurality of group-based communication channels; and displaying the channeled copy with the receiver channel via the group-based communication interface.

In some embodiments, the group-based messaging communications may include a text, image, video, or combination thereof. In some embodiments, the graphical identifier may be animated to illustrate movement between a first state and a second state when displayed within the selected group-based communication interface. Further, the receiver channel may be configured to be viewable to each user of the selected group-based communication interface, and in some embodiments, each of the plurality of group-based communication channels may be configured to display a common set of group-based messaging communications to each user of the respective group-based communication channel.

In some embodiments of the method, prior to receiving the channeling association that is configured to establish the connection between the graphical identifier and the receiver channel of the plurality of group-based communication channels, receiving the correlation indication associating the graphical identifier with the selected messaging communication of the group-based messaging communications may not elicit the response to reproduce the selected messaging communication to create the channeled copy within the receiver channel of the plurality of group-based communication channels. Further, in some embodiments, the channeling association that is configured to establish the connection between the graphical identifier and the receiver channel of the plurality of group-based communication channels may not be configured to establish a connection between the graphical identifier and any of the plurality of group-based communication channels of the plurality of group-based communication interfaces other than the receiver channel of the selected group-based communication interface.

Some embodiment of the present method include receiving a second channeling association that is configured to establish a connection between a second graphical identifier and a second receiver channel of the plurality of group-based communication channels; receiving a second correlation indication associating the second graphical identifier with the selected messaging communication of the group-based messaging communications; in response to receiving the second correlation indication, reproducing the selected messaging communication to create a second channeled copy within the second receiver channel of the plurality of group-based communication channels; and displaying the second channeled copy of the selected messaging communication with the second receiver channel via the group-based communication interface.

Further, in some embodiments, reproducing the selected messaging communication to create the channeled copy within the receiver channel of the plurality of group-based communication channels includes analyzing the receiver channel of the plurality of group-based communication channels for the channeled copy of the selected messaging communication within the receiver channel of the plurality of group-based communication channels and reproducing the selected messaging communication to create the channeled copy within the receiver channel of the plurality of group-based communication channels if the channeled copy was not previously present in the receiver channel of the plurality of group-based communication channels.

In some embodiments, the method includes receiving a channeling request that is configured to move between one or more of the plurality of group-based communication channels after displaying the channeled copy with the receiver channel via the group-based communication interface, and displaying one or more of the plurality of group-based communication channels via the group-based communication interface instead of displaying the receiver channel.

Further, in some embodiments, the method includes receiving a plurality of group-based messaging communications to one or more of the plurality of group-based communication channels other than the receiver channel;

and receiving a plurality of correlation indications associating the graphical identifier with a plurality of selected messaging communications of the group-based messaging communications; in response to receiving the plurality of correlation indications, reproducing each of the plurality of selected messaging communications to create a plurality of channeled copies within the receiver channel of the plurality of group-based communication channels; and displaying the plurality of channeled copies with the receiver channel via the group-based communication interface.

In some embodiments, the method further includes receiving a plurality of channeling associations that are configured to establish a plurality of connections, each of the plurality of connections may include at least one graphical identifier and at least one receiver channel of the plurality of group-based communication channels; receiving group-based messaging communications to one or more of the plurality of group-based communication channels other than the receiver channels of the plurality of channeling associations; receiving one or more correlation indications associating at least one of the graphical identifiers with at least one selected messaging communication of the group-based messaging communications; in response to receiving the one or more correlation indications, reproducing the at least one selected messaging communication associated with the at least one graphical identifier to create at least one channeled copy within the at least one receiver channel of the plurality of group-based communication channels; and displaying the at least one channeled copy with the at least one receiver channel via the group-based communication interface.

Another embodiment of the present invention provided is an apparatus including at least a processor, and a memory associated with the processor having computer coded instructions therein, with the computer instructions configured to, when executed by the processor, update a selected group-based communication interface from a plurality of group-based communication interfaces, wherein the selected group-based communication interface may include a plurality of group-based communication channels, by causing the apparatus to: receive a channeling association that is configured to establish a connection between a graphical identifier and a receiver channel of the plurality of group-based communication channels; receive group-based messaging communications to one or more of the plurality of group-based communication channels other than the receiver channel; receive a correlation indication associating the graphical identifier with a selected messaging communication of the group-based messaging communications; in response to receiving the correlation indication, reproduce the selected messaging communication to create a channeled copy within the receiver channel of the plurality of group-based communication channels; and display the channeled copy with the receiver channel via the group-based communication interface. In some embodiments of the apparatus, the group-based messaging communications may include a text, image, video, or combination thereof, and the graphical identifier may be animated to illustrate movement between a first state and a second state when displayed within the selected group-based communication interface. The receiver channel may be configured to be viewable to each user of the selected group-based communication interface, and each of the plurality of group-based communication channels may be configured to display a common set of group-based messaging communications to each user of the respective group-based communication channel.

Further, in some embodiments of the apparatus, the computer instructions may be configured to, when executed by the processor, cause the apparatus to prior to receiving the channeling association that is configured to establish the connection between the graphical identifier and the receiver channel of the plurality of group-based communication channels, receive the correlation indication associating the graphical identifier with the selected messaging communication of the group-based messaging communications and not reproduce the selected messaging communication to create the channeled copy within the receiver channel of the plurality of group-based communication channels in response to receiving the correlation indication.

In some embodiments of the apparatus, the channeling association that is configured to establish the connection between the graphical identifier and the receiver channel of the plurality of group-based communication channels may not be configured to establish a connection between the graphical identifier and any of the plurality of group-based communication channels of the plurality of group-based communication interfaces other than the receiver channel of the selected group-based communication interface.

In some embodiments, the computer instructions are configured to, when executed by the processor, further cause the apparatus to: receive a second channeling association that is configured to establish a connection between a second graphical identifier and a second receiver channel of the plurality of group-based communication channels; receive a second correlation indication associating the second graphical identifier with a second selected messaging communication of the group-based messaging communications; in response to receiving the second correlation indication, reproduce the selected messaging communication to create a second channeled copy within the second receiver channel of the plurality of group-based communication channels; and display the second channeled copy of the second selected messaging communication with the second receiver channel via the group-based communication interface.

In some embodiments, the computer instructions may be configured to, when executed by the processor, further cause the apparatus to analyze the receiver channel of the plurality of group-based communication channels for the channeled copy of the selected messaging communication within the receiver channel of the plurality of group-based communication channels and reproduce the selected messaging communication to create the channeled copy within the receiver channel of the plurality of group-based communication channels if the channeled copy was not previously present in the receiver channel of the plurality of group-based communication channels when the apparatus is caused to reproduce the selected messaging communication to create the channeled copy within the receiver channel of the plurality of group-based communication channels.

Further, in some embodiments, the computer instructions may be configured to, when executed by the processor, further cause the apparatus to receive a channeling request that is configured to move between one or more of the plurality of group-based communication channels after displaying the channeled copy with the receiver channel via the group-based communication interface, and display one or more of the plurality of group-based communication channels via the group-based communication interface instead of displaying the receiver channel.

In some embodiments, the computer instructions may be configured to, when executed by the processor, further cause the apparatus to: receive a plurality of group-based messaging communications to one or more of the plurality of group-based communication channels other than the receiver channel; and receive a plurality of correlation indications associating the graphical identifier with a plurality of selected messaging communications of the group-based messaging communications; in response to receiving the plurality of correlation indications, reproduce each of the plurality of selected messaging communications to create a plurality of channeled copies within the receiver channel of the plurality of group-based communication channels; and display the plurality of channeled copies with the receiver channel via the group-based communication interface.

Further, in some embodiments, the computer instructions may be configured to, when executed by the processor, further cause the apparatus to: receive a plurality of channeling associations that are configured to establish a plurality of connections, each of the plurality of connections may include at least one graphical identifier and at least one receiver channel of the plurality of group-based communication channels; receive group-based messaging communications to one or more of the plurality of group-based communication channels other than the receiver channels of the plurality of channeling associations; receive one or more correlation indications associating at least one of the graphical identifiers with at least one selected messaging communication of the group-based messaging communications; in response to receiving the one or more correlation indications, reproduce the at least one selected messaging communication associated with the at least one graphical identifier to create at least one channeled copy within the at least one receiver channel of the plurality of group-based communication channels; and display the at least one channeled copy with the at least one receiver channel via the group-based communication interface.

In yet another example embodiment, a computer program product may be provided that may include a non-transitory computer readable medium having computer program instructions stored therein, said instructions when executed by a processor update a selected group-based communication interface from a plurality of group-based communication interfaces, wherein the selected group-based communication interface may include a plurality of group-based communication channels, by causing the computer program product to: receive a channeling association that is configured to establish a connection between a graphical identifier and a receiver channel of the plurality of group-based communication channels; receive group-based messaging communications to one or more of the plurality of group-based communication channels other than the receiver channel; receive a correlation indication associating the graphical identifier with a selected messaging communication of the group-based messaging communications; in response to receiving the correlation indication, reproduce the selected messaging communication to create a channeled copy within the receiver channel of the plurality of group-based communication channels; and display the channeled copy with the receiver channel via the group-based communication interface.

In some embodiments, the group-based messaging communications may include a text, image, video, or combination thereof, and the graphical identifier may be animated to illustrate movement between a first state and a second state when displayed within the selected group-based communication interface. The receiver channel may be configured to be viewable to each user of the selected group-based communication interface, and each of the plurality of group-based communication channels are configured to display a common set of group-based messaging communications to each user of the respective group-based communication channel.

In some embodiments, the computer instructions may be configured to, when executed by the processor, further cause the computer program product to prior to receiving the channeling association that is configured to establish the connection between the graphical identifier and the receiver channel of the plurality of group-based communication channels, receive the correlation indication associating the graphical identifier with the selected messaging communication of the group-based messaging communications and not reproduce the selected messaging communication to create the channeled copy within the receiver channel of the plurality of group-based communication channels in response to receiving the correlation indication.

Further, in some embodiments, the channeling association that is configured to establish the connection between the graphical identifier and the receiver channel of the plurality of group-based communication channels may not be configured to establish a connection between the graphical identifier and any of the plurality of group-based communication channels of the plurality of group-based communication interfaces other than the receiver channel of the selected group-based communication interface.

In some embodiments, the computer instructions are configured to, when executed by the processor, further cause the computer program product to: receive a second channeling association that is configured to establish a connection between a second graphical identifier and a second receiver channel of the plurality of group-based communication channels; receive a second correlation indication associating the second graphical identifier with a second selected messaging communication of the group-based messaging communications; in response to receiving the second correlation indication, reproduce the selected messaging communication to create a second channeled copy within the second receiver channel of the plurality of group-based communication channels; and display the second channeled copy of the second selected messaging communication with the second receiver channel via the group-based communication interface.

Further, in some embodiments, the computer instructions may be configured to, when executed by the processor, further cause the computer program product to analyze the receiver channel of the plurality of group-based communication channels for the channeled copy of the selected messaging communication within the receiver channel of the plurality of group-based communication channels and reproduce the selected messaging communication to create the channeled copy within the receiver channel of the plurality of group-based communication channels if the channeled copy was not previously present in the receiver channel of the plurality of group-based communication channels when the apparatus is caused to reproduce the selected messaging communication to create the channeled copy within the receiver channel of the plurality of group-based communication channels.

In some embodiments, the computer instructions may be configured to, when executed by the processor, further cause the computer program product to receive a channeling request that is configured to move between one or more of the plurality of group-based communication channels after displaying the channeled copy with the receiver channel via the group-based communication interface, and display one or more of the plurality of group-based communication channels via the group-based communication interface instead of displaying the receiver channel.

In some embodiments, the computer instructions may be configured to, when executed by the processor, further cause the computer program product to: receive a plurality of group-based messaging communications to one or more of the plurality of group-based communication channels other than the receiver channel; and receive a plurality of correlation indications associating the graphical identifier with a plurality of selected messaging communications of the group-based messaging communications; in response to receiving the plurality of correlation indications, reproduce each of the plurality of selected messaging communications to create a plurality of channeled copies within the receiver channel of the plurality of group-based communication channels; and display the plurality of channeled copies with the receiver channel via the group-based communication interface.

Further, in some embodiments, the computer instructions are configured to, when executed by the processor, further cause the computer program product to: receive a plurality of channeling associations that are configured to establish a plurality of connections, each of the plurality of connections may include at least one graphical identifier and at least one receiver channel of the plurality of group-based communication channels; receive group-based messaging communications to one or more of the plurality of group-based communication channels other than the receiver channels of the plurality of channeling associations; receive one or more correlation indications associating at least one of the graphical identifiers with at least one selected messaging communication of the group-based messaging communications; in response to receiving the one or more correlation indications, reproduce the at least one selected messaging communication associated with the at least one graphical identifier to create at least one channeled copy within the at least one receiver channel of the plurality of group-based communication channels; and display the at least one channeled copy with the at least one receiver channel via the group-based communication interface.

BRIEF DESCRIPTION OF THE FIGURES

Reference will now be made to the accompanying drawings, which are not necessarily drawn to scale, and wherein:

FIG. 10 illustrates a flow diagram of an example system in accordance with some embodiments discussed herein;

DETAILED DESCRIPTION

Figure 1:
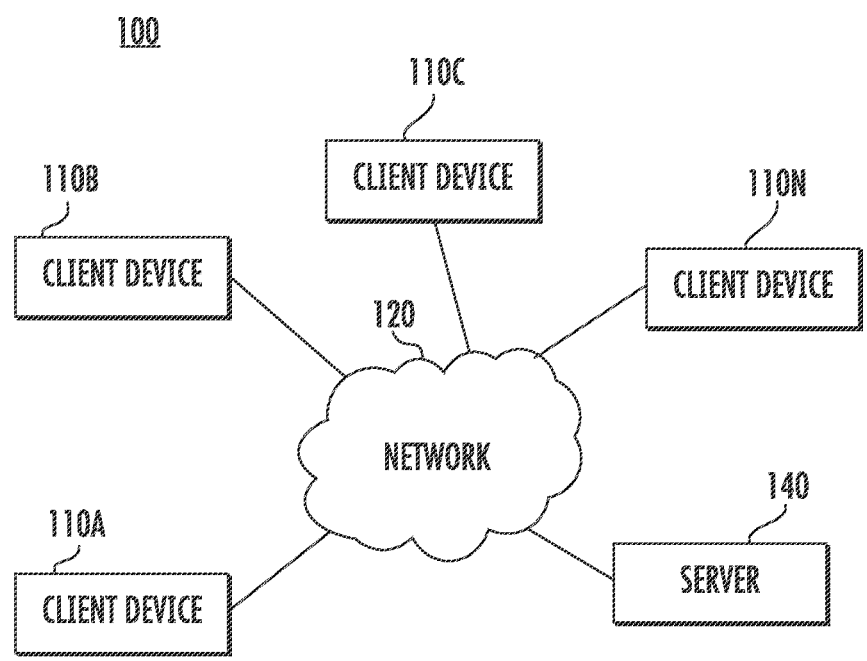
FIG. 1 illustrates an example system in accordance with some embodiments discussed herein.

Some embodiments of the present invention will now be described more fully hereinafter with reference to the accompanying drawings, in which some, but not all embodiments of the inventions are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

Terms

As used herein, the terms "data," "content," "digital content," "digital content object," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

The term "client device" refers to computer hardware and/or software that is configured to access a service made available by a server. The server is often (but not always) on another computer system, in which case the client device accesses the service by way of a network. Client devices may include, without limitation, smart phones, tablet computers, laptop computers, wearables, personal computers, enterprise computers, and the like.

"Group-based" is used herein to refer to a system, channel, message, or virtual environment that has security sufficient such that it is accessible only to a defined group of users. The group may be defined by common access credentials such as those of an organization or commercial enterprise. Access may further be facilitated by a validated request to join or an invitation to join transmitted by one group member user to another non-member user. Group identifiers (defined below) are used to associate data, information, messages, etc., with specific groups.

As used herein, the term "group-based communication channel" refers to a virtual communications environment or feed that is configured to display messaging communications posted by channel members (e.g., validated users accessing the environment using client devices) that are viewable only to the members of the group. The format of the group-based communication channel may appear differently to different users of the group-based communication channel; however, the content of the group-based communication channel (i.e., messaging communications) will be displayed to each member of the group-based communication channel. For instance, a common set of group-based messaging communications will be displayed to each member of the respective group-based communication channel such that the content of the group-based communication channel (i.e., messaging communications) will not vary per member of the group-based communication channel.

The term "user" should be understood to refer to an individual, group of individuals, business, organization, and the like; the users referred to herein are accessing a group-based communication or messaging system using client devices.

The terms "group-based communication channel identifier" or "channel identifier" refer to one or more items of data by which a group-based communication channel may be identified. For example, a group-based communication channel identifier may comprise ASCII text, a pointer, a memory address, and the like.

The terms "group identifier" or "team identifier" refer to one or more items of data by which a group within a group-based communication system may be identified. For example, a group identifier may comprise ASCII text, a pointer, a memory address, and the like.

As used herein, the terms "messaging communication" and "message" refer to any electronically generated digital content object provided by a user using a client device and that is configured for display within a group-based communication channel. Message communications may include any text, image, video, audio, or combination thereof provided by a user (using a client device). For instance, the user may provide a messaging communication that includes text as well as an image and a video within the messaging communication as message contents. In such a case, the text, image, and video would comprise the messaging communication or digital content object. Each message sent or posted to a group-based communication channel of the group-based communication system includes metadata comprising the following: a sending user identifier, a message identifier, message contents, a group identifier, and a group-based communication channel identifier. Each of the foregoing identifiers may comprise ASCII text, a pointer, a memory address, and the like.

A "sending user identifier" is associated with a collection of messages that are sent by a particular user (i.e., a client device associated with the particular user). These messages may be analyzed to determine context regarding the user (e.g., the user's expertise or interest in a topic may be determined based on the frequency of mention of the topic or key words associated with the topic within such messages).

Group-based communication system users are organized into organization groups (e.g., employees of each company may be a separate organization group) and each organization group may have one or more group-based communication channels (explained below) to which users may be assigned or which the users may join (e.g., group-based communication channels may represent departments, geographic locations such as offices, product lines, user interests, topics, issues, and/or the like). A group identifier may be used to facilitate access control for a message (e.g., access to the message, such as having the message return as part of search results in response to a search query, may be restricted to those users having the group identifier associated with their user profile). The group identifier may be used to determine context for the message (e.g., a description of the group, such as the name of an organization and/or a brief description of the organization, may be associated with the group identifier).

Group-based communication system users may join group-based communication channels. Some group-based communication channels may be globally accessible to those users having a particular organizational group identifier associated with their user profile (i.e., users who are members of the organization). Access to some group-based communication channels may be restricted to members of specified groups, whereby the group-based communication channels are accessible to those users having a particular group identifier associated with their user profile. The group-based communication channel identifier may be used to facilitate access control for a message (e.g., access to the message, such as having the message return as part of search results in response to a search query, may be restricted to those users having the group-based communication channel identifier associated with their user profile, or who have the ability to join the group-based communication channel). The group-based communication channel identifier may be used to determine context for the message (e.g., a description of the group-based communication channel, such as a description of a project discussed in the group-based communication channel, may be associated with the group-based communication channel identifier).

The term "private group-based communication channel" refers to a group-based communication channel with restricted access such that it is not generally accessible and/or searchable by other members of the group-based communication system. For example, only those users or administrators who have knowledge of and permission to access (e.g., a group-based communication channel identifier for the private group-based communication channel is associated with their user profile after the user has been validated/authenticated) the private group-based communication channel may view content of the private group-based communication channel.

A "receiver channel" refers to a group-based communication channel that is linked to a graphical identifier. In response to the graphical identifier being associated with (e.g., tagged to) a selected messaging communication of a selected group-based communication channel, a channeled copy of the selected messaging communication is stored in the receiver channel. Notably, the receiver channel is different from the selected group-based communication channel that originated the selected messaging communication and can be accessed separately from the selected group-based communication channel (e.g., without first accessing the selected group-based communication channel).

As used herein, "channeled copy" refers to a copy or duplicate of a messaging communication that includes messaging communication information and is stored for display within a receiver channel. "Messaging communication information" refers to any information associated with the messaging communication, such as information related to the user who created the messaging communication, the group-based communication channel on which the messaging communication was first provided (e.g., the name of the group-based communication channel), the time and date that the messaging communication was first provided, subsequent reproductions of the messaging communication (e.g., date, time, name of the receiver channel, etc. of such reproduction), and any other identifying information related to the messaging communication.

As used herein, the term "graphical identifier" refers to any visual icon, avatar, image, video, photo, or graphic that may be used to label, tag, or otherwise distinguish a selected messaging communication. In some embodiments, the graphical identifier may provide a visual illustration of a sentiment or emotion that a user may wish to associate with a selected messaging communication. For instance, the graphical identifier may be an emoji or an emoticon or other similar expressive visual identification means. In some embodiments, the graphical identifier may be animated, such as to illustrate movement between a first state and a second state when displayed within the selected group-based communication interface. For instance, the graphical identifier may be a series of images of a gavel that when run in sequence illustrate the movement of a gavel knocking against a desk. The animated gavel may then be used in messaging communications that include final decisions as an indicator that such a decision was made.

As used herein, "channeling association" in the context of a graphical identifier and a receiver channel refers to the relationship or correlation of the graphical identifier to the receiver channel. A user can establish a channeling association between a graphical identifier and a receiver channel, cancel a channeling association between a graphical identifier and a receiver channel, and re-establish a channeling association between a graphical identifier and a receiver channel. When re-establishing a channeling association, the group-based communication interface may only associate the respective graphical identifier with the applicable receiver channel for future correlation indications. The channeling association may be made using a variety of user commands such as that depicted below:

[/reacji-channeler:bulb: #ideas]. The channeling association of the graphical identifier (e.g., the bulb) and the receiver channel (e.g., the ideas channel) indicates that the user wants any messaging communication that includes the graphical identifier to appear in the receiver channel. When establishing a channeling association, the group-based communication interface may only associate the respective graphical identifier with the applicable receiver channel for future correlation indications.

As used herein, "correlation indication" refers to the instructions or signals received that indicate the messaging communication has been tied to a graphic identifier.

As used herein, "channeling request" refers to an instruction to access a group-based communication channel, including a receiver channel. The channeling request may be initiated by a channel actuator, which a user of the group-based communication interface can actuate.

The terms "user profile," "user account," and "user account details" refer to information associated with a user, including, for example, a user identifier, one or more group-based communication channel identifiers associated with group-based communication channels that the user has been granted access to, one or more group identifiers for groups with which the user is associated, an indication as to whether the user is an owner of any group-based communication channels, an indication as to whether the user has any group-based communication channel restrictions, a plurality of messages, a plurality of emojis, a plurality of conversations, a plurality of conversation topics, an avatar, an email address, a real name (e.g., John Doe), a username (e.g., jdoe), a password, a real name, a time zone, a status, and the like. The user account details can include a subset designation of user credentials, such as, for example, login information for the user including the user's username and password. For example, and without limitation, a user identifier may include a unique graphical identifier (e.g., an avatar), an IP address, a MAC address, and the like.

Overview

Various embodiments of the invention are directed to updating a selected group-based communication interface (e.g., an interface for Slack Corp.) in a group-based communication system from a plurality of group-based communication interfaces (e.g., an interface for other organizations/companies). The selected group-based communication interface includes a plurality of group-based communication channels (e.g., a marketing channel, sales channel, accounting channel, etc.), including a receiver channel (e.g., a decisions channel, or things-to-know channel). The selected group-based communication interface is accessible and viewable to a select group of users, such as a group of employees of a business or organization (e.g., the Slack Corp. interface would be accessible and viewable to the Slack team). The selected group-based communication interface is updated per the actions of the users of that group-based communication interface and is separate and distinct from other group-based communication interfaces.

Each of the plurality of group-based communication channels in the selected group-based communication interface includes one or more group-based messaging communications. The interface is configured to receive channeling associations within the selected group-based communication interface that associates select messaging communications with one or more receiver channels. The receiver channel is then accessible to a user of the group-based communication interface to view a copy of each of the messaging communications tied to that receiver channel. The original messaging communications remain in the respective group-based communication channel. The selected group-based communication interface thereby efficiently and effectively provides an interface for group-based communications.

The selected group-based communication interface is configured to allow users of the interface to communicate within group-based communication channels and across group-based communication channels to provide relevant information to other users efficiently and effectively. Group-based messaging communications across the plurality of group-based communication channels can be channeled to specific receiver channels providing relevant information to users of the group-based communication interface without the users needing to be a user of each group-based communication channel (or monitoring each group-based communication channel). This allows users of the group-based communication interface to spend less time searching for desired information and allows a user to quickly access relevant information, thereby increasing the efficiency and effectiveness of group-based messaging communications. With less searching and less monitoring of a wide range of group-based communication channels by users, there will be less strain on the system itself leading to increased lifetime and efficiency. For instance, with less monitoring of a wide range of group-based communication channels by users, there will be a reduced number of notifications to users, reduced number of "unread" group-based messaging communications, and thus, reduced strain on the system. The system will be more efficient and effective at providing relevant information to users. The selected group-based communication interface may be used as part of a standalone service, application, or device or it may be applied as a layer atop an existing service application or device.

The selected group-based communication interface is configured to display one or more graphical identifiers. The graphical identifiers may visually represent one or more corresponding items or ideas and in some embodiments, may be animated and configured to show a reaction to a messaging communication. The selected group-based communication interface is configured to receive channeling association(s) that are configured to associate a graphical identifier with at least one receiver channel. The selected group-based communication channels are then configured to receive group-based messaging communications as well as correlation indications configured to associate the graphical identifier with a selected messaging communication of the group-based messaging communications. In response to receiving the correlation indication, the selected group-based communication interface is configured to reproduce the selected messaging communication to create a channeled copy of the selected messaging communication within the receiver channel and display the channeled copy with the receiver channel.

As will be discussed in greater detail below, the selected group-based communication interface is not limited to displaying group-based messaging communications and can also be configured to display a wide variety of messaging communications for any purpose that might be of interest to a user (e.g., direct messaging communications). The selected group-based communication interface may be used to visualize any set of group-based communication channels and messaging communications for any purpose and it may be used in connection with numerous exemplary system architectures as explained in further detail herein.

In some embodiments, the selected group-based communication interface may be configured to be used by a business, organization, team, or other group of individuals and may be tailored to suit the respective group's interests or specific data needs. One of ordinary skill in the art will appreciate that the concepts discussed herein may be applied to better visualize group-based messaging communications on a selected group-based communication interface.

Exemplary Architecture

Methods, apparatuses, and computer program products of the present invention may be embodied by any of a variety of devices. For example, the method, apparatus, and computer program product of an example embodiment may be embodied by a networked device (e.g., an enterprise platform), such as a server or other network entity, configured to communicate with one or more devices, such as one or more client devices. Additionally or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, or any combination of the aforementioned devices.

FIG. 1 shows system 100 including an example network architecture for a system, which may include one or more devices and sub-systems that are configured to implement some embodiments discussed herein. For example, system 100 may include server 140, which can include, for example, the circuitry disclosed in FIGS. 2-4, a server, or database, among other things (not shown). The server 140 may include any suitable network server and/or other type of processing device. In some embodiments, the server 140 may determine and transmit commands and instructions for rendering one or more group-based communication channels to client devices 110A-110N using data from the messaging communications database 300. The messaging communications database 300 may be embodied as a data storage device such as a Network Attached Storage (NAS) device or devices, or as a separate database server or servers. The messaging communications database 300 includes information accessed and stored by the server 140 to facilitate the operations of the group-based communication system 100. For example, the messaging communications database 300 may include, without limitation, a plurality of messaging communications organized among a plurality of group-based communication channels, and/or the like.

Server 140 can communicate with one or more client devices 110A-110N via communications network 120. In this regard, network 120 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, communications network 120 may include a cellular telephone, an 802.11, 802.16, 802.20, and/or WiMax network. Further, the communications network 120 may include a public network, such as the Internet, a private network, such as an intranet, or combinations thereof, and may utilize a variety of networking protocols now available or later developed including, but not limited to TCP/IP based networking protocols. For instance, the networking protocol may be customized to suit the needs of the group-based communication interface. In some embodiments, the protocol is a custom protocol of JSON objects sent via a Websocket channel. In some embodiments, the protocol is JSON over RPC, JSON over REST/HTTP, and the like.

The server 140 may provide for receiving of electronic data from various sources, including but not necessarily limited to the client devices 110A-110N. For example, the server 140 may be operable to receive and post or transmit group-based messaging communications provided by the client devices 110A-110N.

Client devices 110A-110N and/or server 140 may each be implemented as a personal computer and/or other networked device, such as a cellular phone, tablet computer, mobile device, point of sale terminal, inventory management terminal etc., that may be used for any suitable purpose in addition to presenting the interface to facilitate buying items and/or offering items for sale. The depiction in FIG. 1 of "N" users is merely for illustration purposes. Any number of users may be included in the system 100 so long as the users have the proper credentials for accessing the selected group-based communication interface. In one embodiment, the client devices 110A-110N may be configured to display an interface on a display of the client device for viewing, creating, editing, and/or otherwise interacting with at least one group-based communication channel, which may be provided by the server 140. According to some embodiments, the server 140 may be configured to display the interface on a display of the server 140 for viewing, creating, editing, and/or otherwise interacting with a group-based communication channel. In some embodiments, an interface of a client device 110A-110N may be different from an interface of a server 140. The client devices 110A-110N may be used in addition to or instead of the server 140. System

100 may also include additional client devices and/or servers, among other things. Additionally or alternatively, the client device 110A-110N may interact with the group-based communication system 100 via a web browser. As yet another example, the client device 110A-110N may include various hardware or firmware designed to interface with the group-based communication system 100.

The client devices 110A-110N may be any computing device as defined above. Electronic data received by the group-based communication server 106 from the client devices 110A-110N may be provided in various forms and via various methods. For example, the client devices 110A-110N may include desktop computers, laptop computers, smartphones, netbooks, tablet computers, wearables, and the like.

In embodiments where a client device 110A-110N is a mobile device, such as a smart phone or tablet, the client device 110A-110N may execute an "app" to interact with the group-based communication system 100. Such apps are typically designed to execute on mobile devices, such as tablets or smartphones. For example, an app may be provided that executes on mobile device operating systems such as iOS®, Android®, or Windows®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications. Communication with hardware and software modules executing outside of the app is typically provided via application programming interfaces (APIs) provided by the mobile device operating system.

Additionally or alternatively, the client device 110A-110N may interact with the group-based communication system 100 via a web browser. As yet another example, the client device 110A-110N may include various hardware or firmware designed to interface with the group-based communication system 100.

In some embodiments of an exemplary group-based communication system, a message or messaging communication may be sent from a client device 110A-110N to a server 140. In various implementations, the message may be sent to the group-based communication system 100 over communications network 120 directly by a client device 110A-110N, the message may be sent to the group-based communication system 100 via an intermediary such as a message server, and/or the like. For example, the client device 110A-110N may be a desktop, a laptop, a tablet, a smartphone, and/or the like that is executing a client application (e.g., a group-based communication app). In one implementation, the message may include data such as a message identifier, sending user identifier, a group identifier, a group-based communication channel identifier, message contents (e.g., text, emojis, images, links), attachments (e.g., files), message hierarchy data (e.g., the message may be a reply to another message), third party metadata, and/or the like. In one embodiment, the client device 110A-110N may provide the following example message, substantially in the form of a (Secure) Hypertext Transfer Protocol ("HTTP(S)") POST message including eXtensible Markup Language ("XML") formatted data, as provided below:

```
POST/authrequest.php HTTP/1.1
Host: www.server.com
Content-Type: Application/XML
Content-Length: 667
<?XML version = "1.0" encoding = "UTF-8"?>
<auth_request>
<timestamp>2020-12-31 23:59:59</timestamp>
<user_accounts_details>
<user_account_credentials>
<user_name>ID_user_1</user_name>
<password>abc123</password>
//OPTIONAL <cookie>cookieID</cookie>
//OPTIONAL
<digital_cert_link>www.mydigitalcertificate.com/JohnDoeDaDoeDoe@gmail.com/mycertifcate.dc
</digital_cert_link>
//OPTIONAL <digital_certificate>_DATA_</digital_certificate>
</user_account_credentials>
</user_accounts_details>
<client_details> //iOS Client with App and Webkit
//it should be noted that although several client details
//sections are provided to show example variants of client
//sources, further messages will include only on to save
//space
<client IP>10.0.0.123</client IP>
<user_agent_string>Mozilla/5.0 (iPhone; CPU iPhone OS 7_1_1 like Mac OS X)
AppleWebKit/537.51.2 (KHTML, like Gecko) Version/7.0 Mobile/11D201
Safari/9537.53</user_agent_string>
<client_product_type>iPhone6,1</client_product_type>
<client_serial_number>DNXXX1X1XXXX</client_serial_number>
<client_UDID>3XXXXXXXXXXXXXXXXXXXXXXXXXD</client_UDID>
<client_OS>iOS</client_OS>
<client_OS_version>7.1.1</client_OS_version>
<client_app_type>app with webkit</client_app_type>
<app_installed_flag>true</app_installed_flag>
<app_name>Error! Reference source not found...app</app_name>
<app_version>1.0</app_version>
<app_webkit_name>Mobile Safari</client_webkit_name>
<client_version>537.51.2</client_version>
</client_details>
<client_details> //iOS Client with Webbrowser
<client_IP>10.0.0.123</client_IP>
```

-continued

```
<user_agent_string>Mozilla/5.0 (iPhone; CPU iPhone OS 7_1_1 like Mac OS X)
AppleWebKit/537.51.2 (KHTML, like Gecko) Version/7.0 Mobile/11D201
Safari/9537.53</user_agent_string>
<client_product_type>iPhone6,1</client_product_type>
<client_serial_number>DNXXX1X1XXXX</client_serial_number>
<client_UDID>3XXXXXXXXXXXXXXXXXXXXXXXXD</client_UDID>
<client_OS>iOS</client_OS>
<client_OS version>7.1.1</client_OS_version>
<client_app_type>web browser</client_app_type >
<client_name>Mobile Safari</client_name>
<client_version>9537.53</client_version>
</client_details>
<client_details> //Android Client with Webbrowser
<client_IP>10.0.0.123</client_IP>
<user_agent_string>Mozilla/5.0 (Linux; U; Android 4.0.4; en-us; Nexus S Build/IMM76D)
AppleWebKit/534.30 (KHTML, like Gecko) Version/4.0 Mobile Safari/534.30</user_agent_string>
<client_product_type>Nexus S</client_product_type>
<client_serial_number>YXXXXXXXXZ</client_serial_number>
<client_UDID>FXXXXXXXXX-XXXX-XXXX-XXXX-XXXXXXXXXXXX</client_UDID>
<client_OS>Android</client_OS>
<client_OS_version>4.0.4</client_OS_version>
<client_app_type>web browser</client_app_type>
<client_name>Mobile Safari</client_name>
<client_version>534.30</client_version>
</client_details>
<client_details>//Mac Desktop with Webbrowser
<client_IP>10.0.0.123</client_IP>
<user_agent_string>Mozilla/5.0 (Macintosh; Intel Mac OS X 10_9_3) AppleWebKit/537.75.14
(KHTML, like Gecko) Version/7.0.3 Safari/537.75.14</user_agent_string>
<client_product_type>MacPro5,1</client_product_type>
<client_serial_number>YXXXXXXXXZ</client_serial_number>
<client_UDID>FXXXXXXXXX-XXXX-XXXX-XXXX-XXXXXXXXXXXX</client_UDID>
<client_OS>Mac OS X</client_OS>
<client_OS_version>10.9.3</client_OS_version>
<client_app_type>web browser</client_app_type>
<client_name>Mobile Safari</client_name>
<client_version>537.75.14</client_version>
</client_details>
<message>
<message_identifier>ID_message_10</message_identifier>
<team_identifier>ID_team_1</team_identifier>
<channel_identifier>ID_channel_1</channel_identifier>
<contents>That is an interesting invention. I have attached a copy our patent policy.</contents>
<attachments>patent_policy.pdf</attachments>
</message>
</auth_request>
```

The group-based communication system 100 comprises at least one server 140 that may create a storage message based upon the received message to facilitate message indexing and storage in a messaging communication database, as will be described further below. In one implementation, the storage message may include data such as a message identifier, a group identifier, a group-based communication channel identifier, a sending user identifier, topics, responses, message contents, attachments, message hierarchy data, third party metadata, conversation primitive data, and/or the like. For example, the server 140 may provide the following example storage message, substantially in the form of a HTTP(S) POST message including XML-formatted data, as provided below:

```
POST/storage_message.php HTTP/1.1
Host: www.server.com
Content-Type: Application/XML
Content-Length: 667
<?XML version = "1.0" encoding = "UTF-8"?>
<storage_message>
<message_identifier>ID_message_10</message_identifier>
<team_identifier>ID_team_1</team_identifier>
<channel_identifier>ID_channel_1</channel_identifier>
<sending_user_identifier>ID_user_1</sending_user_identifier>
<topics>
<topic>inventions</topic>
<topic>patents</topic>
<topic>policies</topic>
</topics>
<responses>
<response>liked by ID_user_2</response>
<response>starred by ID_user_3</response>
```

```
</responses>
<contents>That is an interesting invention. I have attached a copy our patent policy.</contents>
<attachments>patent_policy.pdf</attachments>
<conversation_primitive>
    conversation includes messages: ID_message_8, ID_message_9, ID_message_10,
    ID_message_11, ID_message_12
</conversation_primitive>
</storage_message>
```

In embodiments, a group identifier as defined above may be associated with the message.

In embodiments, a group-based communication channel identifier as defined above may be associated with the message.

In embodiments, a sending user identifier as defined above may be associated with the message. In one implementation, the message may be parsed (e.g., using PHP commands) to determine a sending user identifier of the user who sent the message.

In embodiments, topics may be associated with the message. In one implementation, the message contents may be parsed (e.g., using PHP commands) to determine topics discussed in the message. For example, hashtags in the message may indicate topics associated with the message. In another example, the message may be analyzed (e.g., by itself, with other messages in a conversation primitive) or parsed using a machine learning technique, such as topic modeling, to determine topics associated with the message.

In embodiments, data indicating responses may be associated with the message. For example, responses to the message by other users may include reactions (e.g., selection of an emoji associated with the message, selection of a "like" button associated with the message), clicking on a hyperlink embedded in the message, replying to the message (e.g., posting a message to the group-based communication channel in response to the message), downloading a file associated with the message, sharing the message from one group-based communication channel to another group-based communication channel, pinning the message, starring the message, and/or the like. In one implementation, data regarding responses to the message by other users may be included with the message, and the message may be parsed (e.g., using PHP commands) to determine the responses. In another implementation, data regarding responses to the message may be retrieved from a database. For example, data regarding responses to the message may be retrieved via a MySQL database command similar to the following:
SELECT messageResponses
FROM MSM_Message
WHERE messageID=ID_message_10.

For example, data regarding responses to the message may be used to determine context for the message (e.g., a social score for the message from the perspective of some user). In another example, data regarding responses to the message may be analyzed to determine context regarding the user (e.g., the user's expertise in a topic may be determined based on the responses to the user's message regarding the topic).

In embodiments, attachments may be included with the message. If there are attachments, files may be associated with the message. In one implementation, the message may be parsed (e.g., using PHP commands) to determine file names of the attachments. For example, file contents may be analyzed to determine context for the message (e.g., a patent policy document may indicate that the message is associated with the topic "patents").

In embodiments, third party metadata may be associated with the message. For example, third party metadata may provide additional context regarding the message or the user that is specific to a company, group, group-based communication channel, and/or the like. In one implementation, the message may be parsed (e.g., using PHP commands) to determine third party metadata. For example, third party metadata may indicate whether the user who sent the message is an authorized representative of the group-based communication channel (e.g., an authorized representative may be authorized by the company to respond to questions in the group-based communication channel).

In embodiments, a conversation primitive may be associated with the message. In one implementation, a conversation primitive is an element used to analyze, index, store, and/or the like messages. For example, the message may be analyzed by itself, and may form its own conversation primitive. In another example, the message may be analyzed along with other messages that make up a conversation, and the messages that make up the conversation may form a conversation primitive. In one implementation, the conversation primitive may be determined as the message, a specified number (e.g., two) of preceding messages and a specified number (e.g., two) of following messages. In another implementation, the conversation primitive may be determined based on analysis of topics discussed in the message and other messages (e.g., in the channel) and/or proximity (e.g., message send order proximity, message send time proximity) of these messages.

In embodiments, various metadata, determined as described above, and/or the contents of the message may be used to index the message (e.g., using the conversation primitive) to facilitate various facets of searching (i.e., search queries that return results from messaging communication database). In one implementation, a storage message may be sent from group-based communication server 140 to facilitate indexing in the messaging communication database. In another implementation, metadata associated with the message may be determined and the message may be indexed in the messaging communication database. In one embodiment, the message may be indexed such that a company's or a group's messages are indexed separately (e.g., in a separate index associated with the group and/or company that is not shared with other groups and/or companies). In one implementation, messages may be indexed at a separate distributed database (e.g., to facilitate data isolation for security purposes).

If there are attachments associated with the message, file contents of the associated files may be used to index such files in the messaging communication database to facilitate searching. In one embodiment, the files may be indexed such that a company's or a group's files are indexed at a separate distributed database.

Figure 2:
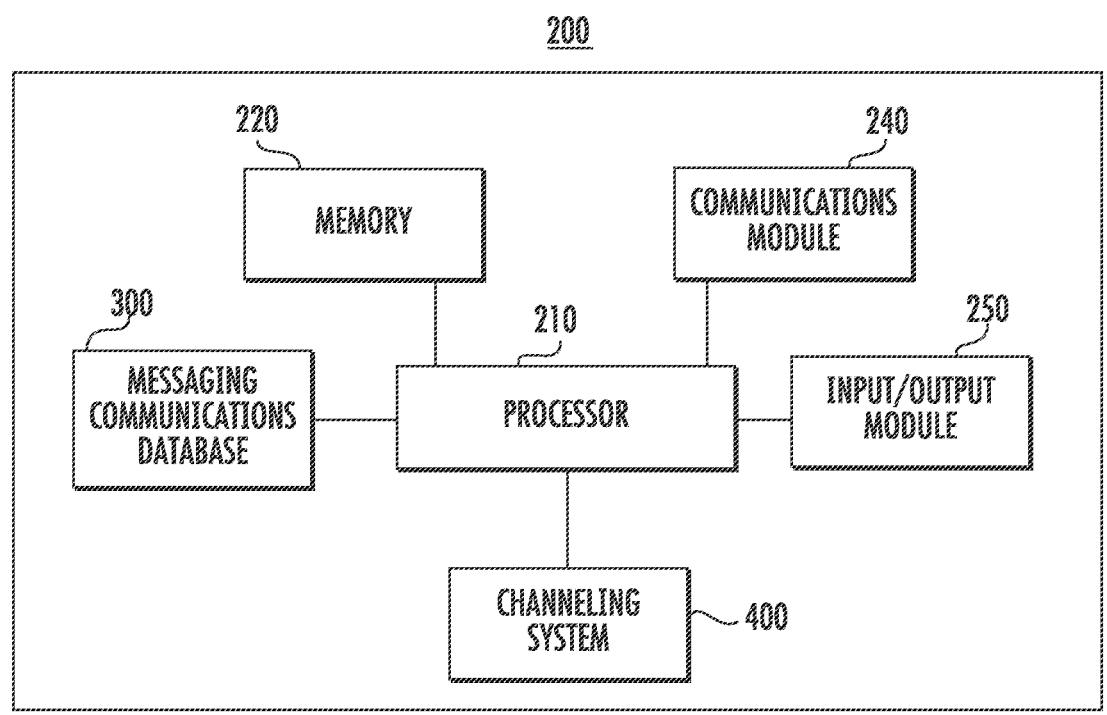
FIG. 2 illustrates a schematic block diagram of circuitry that can be included in a computing device in accordance with some embodiments discussed herein.

FIG. 2 shows a schematic block diagram of circuitry 200, some or all of which may be included in, for example, server 140 and/or client devices 110A-110N. Any of the aforementioned systems or devices may include the circuitry 200 and may be configured to, either independently or jointly with other devices in a network 120 perform the functions of the circuitry 200 described herein. As illustrated in FIG. 2, in accordance with some example embodiments, circuitry 200 can includes various means, such as processor 210, memory 220, communications module 240, and/or input/output module 250. In some embodiments, messaging communications database 300 and/or a channeling system 400 may also or instead be included. As referred to herein, "module" includes hardware, software and/or firmware configured to perform one or more particular functions. In this regard, the means of circuitry 200 as described herein may be embodied as, for example, circuitry, hardware elements (e.g., a suitably programmed processor, combinational logic circuit, and/or the like), a computer program product comprising computer-readable program instructions stored on a non-transitory computer-readable medium (e.g., memory 220) that is executable by a suitably configured processing device (e.g., processor 210), or some combination thereof.

Processor 210 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 2 as a single processor, in some embodiments processor 210 comprises a plurality of processors. The plurality of processors may be embodied on a single computing device or may be distributed across a plurality of computing devices collectively configured to function as circuitry 200. The plurality of processors may be in operative communication with each other and may be collectively configured to perform one or more functionalities of circuitry 200 as described herein. In an example embodiment, processor 210 is configured to execute instructions stored in memory 220 or otherwise accessible to processor 210. These instructions, when executed by processor 210, may cause circuitry 200 to perform one or more of the functionalities of circuitry 200 as described herein.

Whether configured by hardware, firmware/software methods, or by a combination thereof, processor 210 may comprise an entity capable of performing operations according to embodiments of the present invention while configured accordingly. Thus, for example, when processor 210 is embodied as an ASIC, FPGA or the like, processor 210 may comprise specifically configured hardware for conducting one or more operations described herein. Alternatively, as another example, when processor 210 is embodied as an executor of instructions, such as may be stored in memory 220, the instructions may specifically configure processor 210 to perform one or more algorithms and operations described herein, such as those discussed in connection with FIGS. 1-14.

Memory 220 may comprise, for example, volatile memory, non-volatile memory, or some combination thereof. Although illustrated in FIG. 2 as a single memory, memory 220 may comprise a plurality of memory components. The plurality of memory components may be embodied on a single computing device or distributed across a plurality of computing devices. In various embodiments, memory 220 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. Memory 220 may be configured to store information, data (including item data and/or user account details), applications, instructions, or the like for enabling circuitry 200 to carry out various functions in accordance with example embodiments of the present invention. For example, in at least some embodiments, memory 220 is configured to buffer input data for processing by processor 210. Additionally or alternatively, in at least some embodiments, memory 220 is configured to store program instructions for execution by processor 210. Memory 220 may store information in the form of static and/or dynamic information. This stored information may be stored and/or used by circuitry 200 during the course of performing its functionalities.

Communications module 240 may be embodied as any device or means embodied in circuitry, hardware, a computer program product comprising computer readable program instructions stored on a computer readable medium (e.g., memory 220) and executed by a processing device (e.g., processor 210), or a combination thereof that is configured to receive and/or transmit data from/to another device and/or network, such as, for example, a second circuitry 200 and/or the like. In some embodiments, communications module 240 (like other components discussed herein) can be at least partially embodied as or otherwise controlled by processor 210. In this regard, communications module 240 may be in communication with processor 210, such as via a bus. Communications module 240 may include, for example, an antenna, a transmitter, a receiver, a transceiver, network interface card and/or supporting hardware and/or firmware/software for enabling communications with another computing device. Communications module 240 may be configured to receive and/or transmit any data that may be stored by memory 220 using any protocol that may be used for communications between computing devices. Communications module 240 may additionally or alternatively be in communication with the memory 220, input/output module 250 and/or any other component of circuitry 200, such as via a bus.

Input/output module 250 may be in communication with processor 210 to receive an indication of a user input and/or to provide an audible, visual, mechanical, or other output to a user (e.g., provider and/or consumer). Some example visual outputs that may be provided to a user by circuitry 200 are discussed in connection with FIGS. 1-14. As such, input/output module 250 may include support, for example, for a keyboard, a mouse, a joystick, a display, a touch screen display, a microphone, a speaker, a RFID reader, barcode reader, biometric scanner, and/or other input/output mechanisms. In embodiments wherein circuitry 200 is embodied as a server or database, aspects of input/output module 250 may be reduced as compared to embodiments where circuitry 200 is implemented as an end-user machine (e.g., consumer device and/or provider device) or other type of device designed for complex user interactions. In some embodiments (like other components discussed herein), input/output module 250 may even be eliminated from circuitry 200. Alternatively, such as in embodiments wherein circuitry 200 is embodied as a server or database, at least some aspects of input/output module 250 may be embodied on an apparatus used by a user that is in communication with circuitry 200. Input/output module 250 may be in communication with the memory 220, communications module 240, and/or any other component(s), such as via a bus. One or more than one input/output module and/or other component can be included in circuitry 200.

Messaging communications database 300 and channeling system 400 may also or instead be included and configured to perform the functionality discussed herein related to generating and/or editing group-based communication channels. In some embodiments, some or all of the functionality of generating and/or editing group-based communication channels may be performed by processor 210. In this regard, the example processes and algorithms discussed herein can be performed by at least one processor 210, messaging communications database 300, and/or channeling system 400. For example, non-transitory computer readable media can be configured to store firmware, one or more application programs, and/or other software, which include instructions and other computer-readable program code portions that can be executed to control each processor (e.g., processor 210, messaging communications database 300, and/or channeling system 400) of the components of circuitry 200 to implement various operations, including the examples shown above. As such, a series of computer-readable program code portions are embodied in one or more computer program goods and can be used, with a computing device, server, and/or other programmable apparatus, to produce machine-implemented processes.

Figure 3:
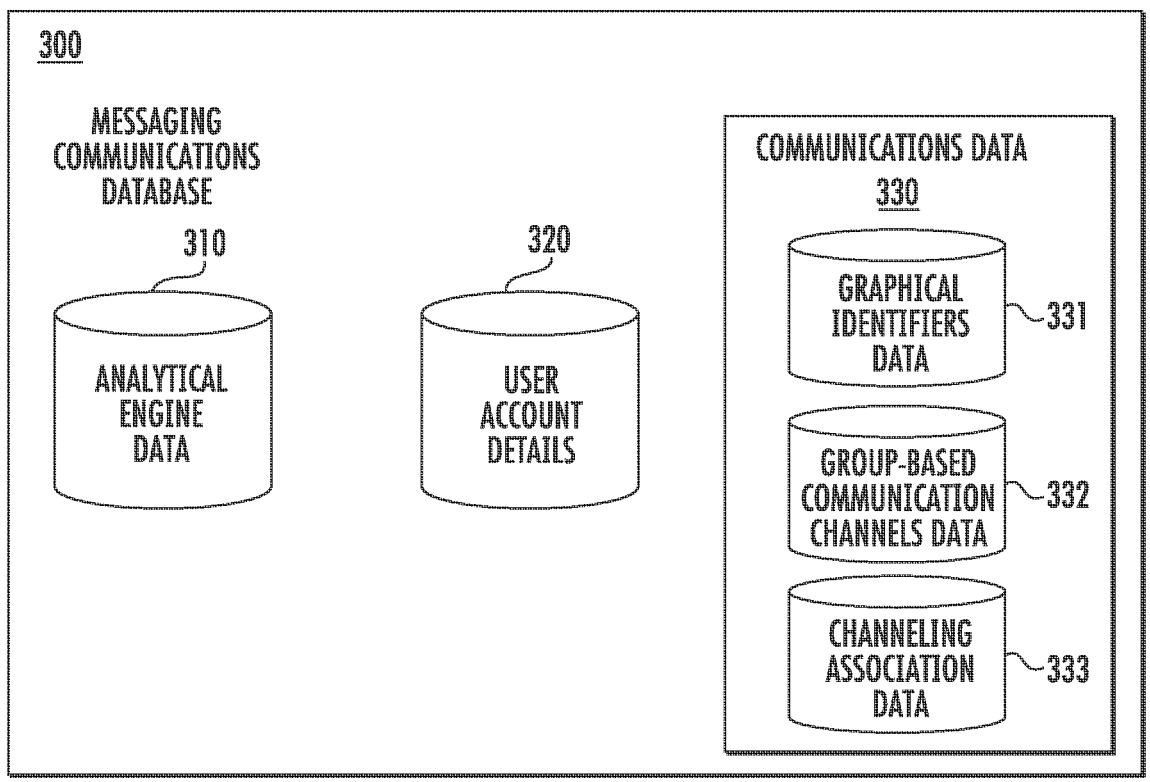
FIG. 3 illustrates an example messaging communications database in accordance with some embodiments discussed herein.

In some embodiments, a messaging communications database 300 may be provided that includes communications data, user account details, and/or analytical engine data. As shown in FIG. 3, in this embodiment, communications data 330 includes graphical identifiers data 331, group-based communication channels data 332, and/or channeling association data 333. For instance, channeling associations may be received by the system 200 and stored in the messaging communications database 300 as channeling association data 333. Similarly, graphical identifiers may be stored in the messaging communications database 300 as graphical identifiers data 331 and data relating to group-based communication channels may be stored in the messaging communications database 300 as group-based communication channels data 332. User account details 320, in some embodiments, may include biographical data and/or preference data associated with individual profiles or group profiles. Additionally or alternatively, the messaging communications database 300 may include analytical engine data 310 which provides any additional information needed by the channeling system 400 in analyzing messaging communications, indications, and requests and generating and/or editing group-based communication channels.

For example, channeling system 400 can be configured to analyze multiple sets of data (e.g., including various combinations of graphical identifiers, group-based communication channels, channeling associations, correlation indications, etc.), such as the data in the messaging communications database 300. In this way, channeling system 400 may support multiple algorithms, including those discussed below with respect to graphical identifiers, group-based communication channels, channeling associations, etc., so that the selected algorithm may be chosen at runtime. Further, the present configuration can enable flexibility in terms of configuring additional contexts.

Figure 4:
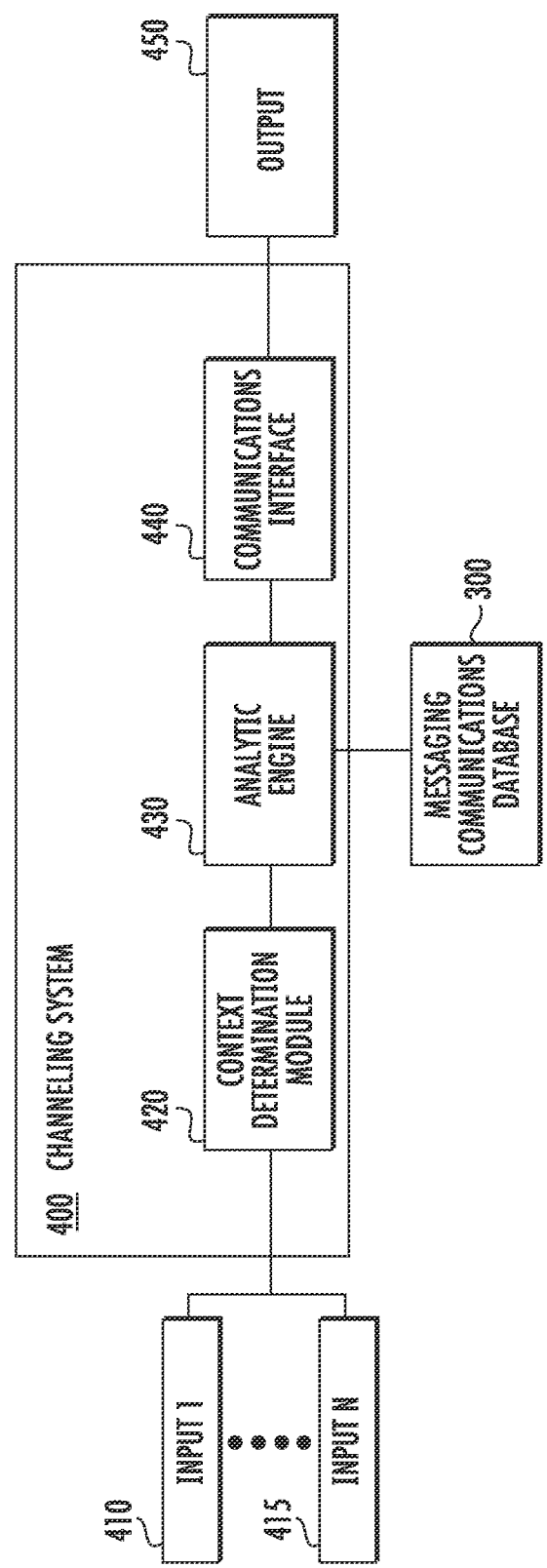
FIG. 4 illustrates an example correlation indication system in accordance with some embodiments discussed herein.

In some embodiments, with reference to FIG. 4, the channeling system 400 may include a context determination module 420, analytical engine 430, and communications interface 440, all of which may be in communication with the messaging communications database 300. The channeling system 400 may receive one or more correlation indications as inputs 405, 410 and may generate channeled copies in receiver channels in response. The channeling system 400 may receive one or more channeling requests as inputs 405, 410 and may generate the requested group-based communication channel in response. In some embodiments, the inputs 405, 410 may include a request to cancel a channeling association, while in some embodiments the inputs 405, 410 may include a request to re-establish a channeling association (e.g., simply by creating a new channeling association). The channeling system 400 may use any of the algorithms or processes disclosed herein for receiving a correlation indication and generating a channeled copy of a respective messaging communication in response; receiving channeling requests and generating the requested communication channel in response; receiving channeling associations and requests to cancel channeling associations and generating the applicable response (e.g., storing the channeling associations or canceling stored channeling associations in the messaging communications database 300). In some other embodiments, such as when the circuitry 200 is embodied in a server 140 and/or client devices 110A-110N, the channeling system 400 may be located in another circuitry 200 or another device, such as another server 140 and/or client devices 110A-110N.

The channeling system 400 can be configured to access data corresponding to one or more group-based communication channels, graphical identifiers, user profiles, group profiles, and channeling associations, and generate one or more channeled copies of selected group-based messaging communications.

With reference to FIG. 4, whether used locally or over a network, the channeling system 400 may be used to generate one or more group-based communication channels that may be established as a receiver channel that is configured to receive channeled copies of selected group-based messaging communications. The system may receive a plurality of inputs 405, 410 from the circuitry 200 and process the inputs within the channeling system 400 to produce an output 450, which may include a receiver channel with one or more channeled copies. In some embodiments, the channeling system 400 may execute context determination module 420, process the data in an analytical engine 430, and output the results via the communications interface 440. Each of these steps may pull data from a plurality of sources including the messaging communications database 300.

When inputs 405, 410 are received by the channeling system 400, a context determination using context determination module 420 may first be made. A context determination includes such information as user account details (e.g., what user profile is associated with the input 405, 410), preference data of the group-based communication interface, and what request or indication was received as the input 405, 410. These inputs may give context to the channeling system's 400 analysis to determine the output. For example, the context determination module 420 may inform the channeling system 400 as to what messaging communication information to include with the output communication channel and/or messaging communication(s).

The channeling system 400 may then analyze the inputs 405, 410 using the analytical engine 430. The analytical engine 430 draws information about the graphical identifier and/or group-based communication channel (e.g., the receiver channel and/or the group-based communication channel in which a request and/or indication was made) from the messaging communications database 300 and then, in light of the context determination module's 420 determination, computes a group-based communication channel (e.g., a receiver channel). The communications interface 440 may then output 450 the applicable group-based communication channel (e.g., including channeled copies if a receiver channel) with the applicable messaging communication information. In some embodiments, the analytical engine 430 may determine that a channeled copy of a selected group-based messaging communication has already been presented in the applicable receiver channel. In such cases, the communications interface 440 may not output 450 another channeled copy of the selected group-based messaging communication, and instead, may output 450 the original channeled copy of the selected group-based messaging communication. The analytical engine 430 may determine that a channeled copy of a selected group-based messaging communication has already been presented in an applicable receiver channel by identifying a unique timestamp associated with the selected group-based messaging communication.

In some embodiments, the channeling system 400 may verify the inputs 405, 410. For instance, the channeling system 400 may verify that the inputs 405, 410 are from one or more components of the circuitry 200, for instance, by validating a shared secret. As noted above, the components of the circuitry 200, including the various elements that may be part of each component, may communicate via wired or wireless connections and may be physically separate. Thus, in some embodiments, it may be desired to verify that received inputs are part of the selected group-based communication interface.

As will be appreciated, any such computer program instructions and/or other type of code may be loaded onto a computer, processor or other programmable apparatus's circuitry to produce a machine, such that the computer, processor other programmable circuitry that execute the code on the machine create the means for implementing various functions, including those described herein.

It is also noted that all or some of the information presented by the example displays discussed herein can be based on data that is received, generated and/or maintained by one or more components of a local or networked system and/or circuitry 200. In some embodiments, one or more external systems (such as a remote cloud computing and/or data storage system) may also be leveraged to provide at least some of the functionality discussed herein.

As described above and as will be appreciated based on this disclosure, embodiments of the present invention may be configured as methods, personal computers, servers, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Embodiments of the present invention have been described above with reference to block diagrams and flowchart illustrations of methods, apparatuses, systems and computer program goods. It will be understood that each block of the circuit diagrams and process flowcharts, and combinations of blocks in the circuit diagrams and process flowcharts, respectively, can be implemented by various means including computer program instructions. These computer program instructions may be loaded onto a general purpose computer, special purpose computer, or other programmable data processing apparatus, such as processor 210, messaging communications database 300, and/or channeling system 400 discussed above with reference to FIG. 2, to produce a machine, such that the computer program product includes the instructions which execute on the computer or other programmable data processing apparatus create a means for implementing the functions specified in the flowchart block or blocks.

These computer program instructions may also be stored in a computer-readable storage device (e.g., memory 220) that can direct a computer or other programmable data processing apparatus to function in a particular manner, such that the instructions stored in the computer-readable storage device produce an article of manufacture including computer-readable instructions for implementing the function discussed herein. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions discussed herein. Accordingly, blocks of the block diagrams and flowchart illustrations support combinations of means for performing the specified functions, combinations of steps for performing the specified functions and program instruction means for performing the specified functions. It will also be understood that each block of the circuit diagrams and process flowcharts, and combinations of blocks in the circuit diagrams and process flowcharts, can be implemented by special purpose hardware-based computer systems that perform the specified functions or steps, or combinations of special purpose hardware and computer instructions.

Dynamic UI

Figure 5:
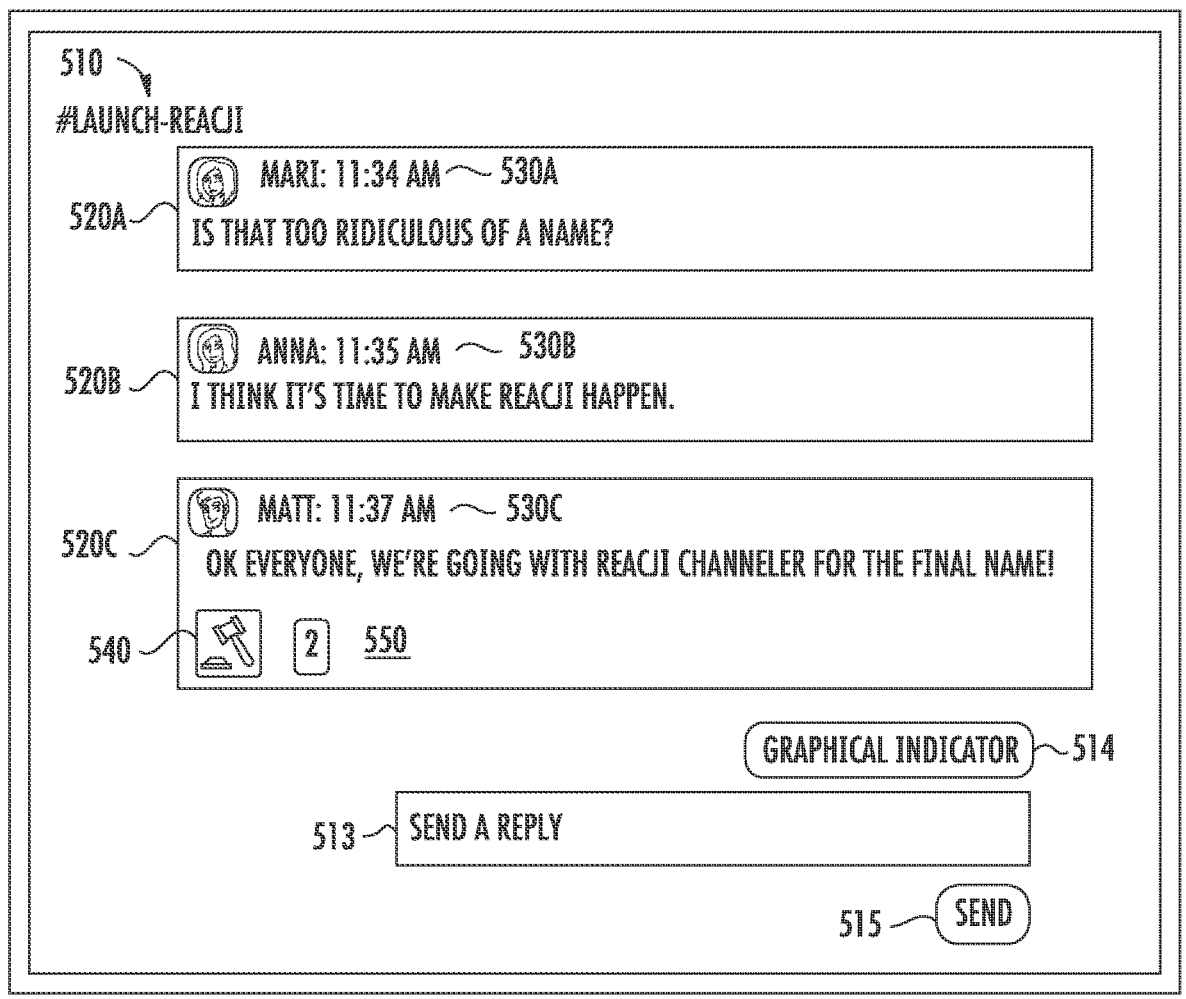
FIG. 5 illustrates an example group-based communication interface having group-based messaging communications in a group-based communication channel other than a receiver channel in accordance with some embodiments discussed herein.

FIG. 5 illustrates an example selected group-based communication interface 500 structured in accordance with various embodiments of the invention. The depicted group-based communication interface 500 presents group-based communication channel 501 including multiple group-based messaging communications 520A-520C. The group-based messaging communications 520A-520C are shown with text; however, in other embodiments, the group-based messaging communications 520A-520C may include some other means (e.g., picture, photo, symbol, QR code, ID number, etc.) to convey information. As shown in FIG. 5, in this embodiment, messaging communication information 530A-530C is also included with each group-based messaging communication 520A-520C. The messaging communication information 530A-530C includes a user identifier and time of receiving the group-based messaging communication. The messaging communication information 530A-530C may include other identifying information instead or in addition to the data shown in FIG. 5. The group-based communication channel 501 also shows the name 510 of the group-based communication channel 501 and may include other identifying information for the group-based communication channel 501 (e.g., date of creation, time of last messaging communication, users of group-based communication channel, etc.).

As shown in FIG. 5, group-based messaging communication 520C includes a graphical identifier 540. The graphical identifier 540 is shown as an image of a gavel, but can be any suitable image or visual object including animated object. As also shown in FIG. 5, in this embodiment, a messaging communication input area 513 is provided in the group-based communication channel 501 where users can input group-based messaging communications (such as 520A-520C). The group-based communication interface 500 includes a messaging actuator 515 (e.g., a button) that the user can select to enter the messaging communication in the messaging communication input area 513. The group-based communication interface 500 also includes a graphical identifier actuator 514. The graphical identifier actuator 514 allows a user to associate a graphical identifier (such as the graphical identifier 540) with a messaging communication. The messaging actuator 515 initiates transmission of the messaging communication with the graphical identifier, providing a correlation indication to the circuitry 200 for processing. Each transmission of each graphical identifier initiates a correlation indication to the circuitry 200 for processing. The messaging communication with the graphical identifier is then displayed in the group-based communication channel 501 (as shown in group-based messaging communication 520C).

Figure 6:
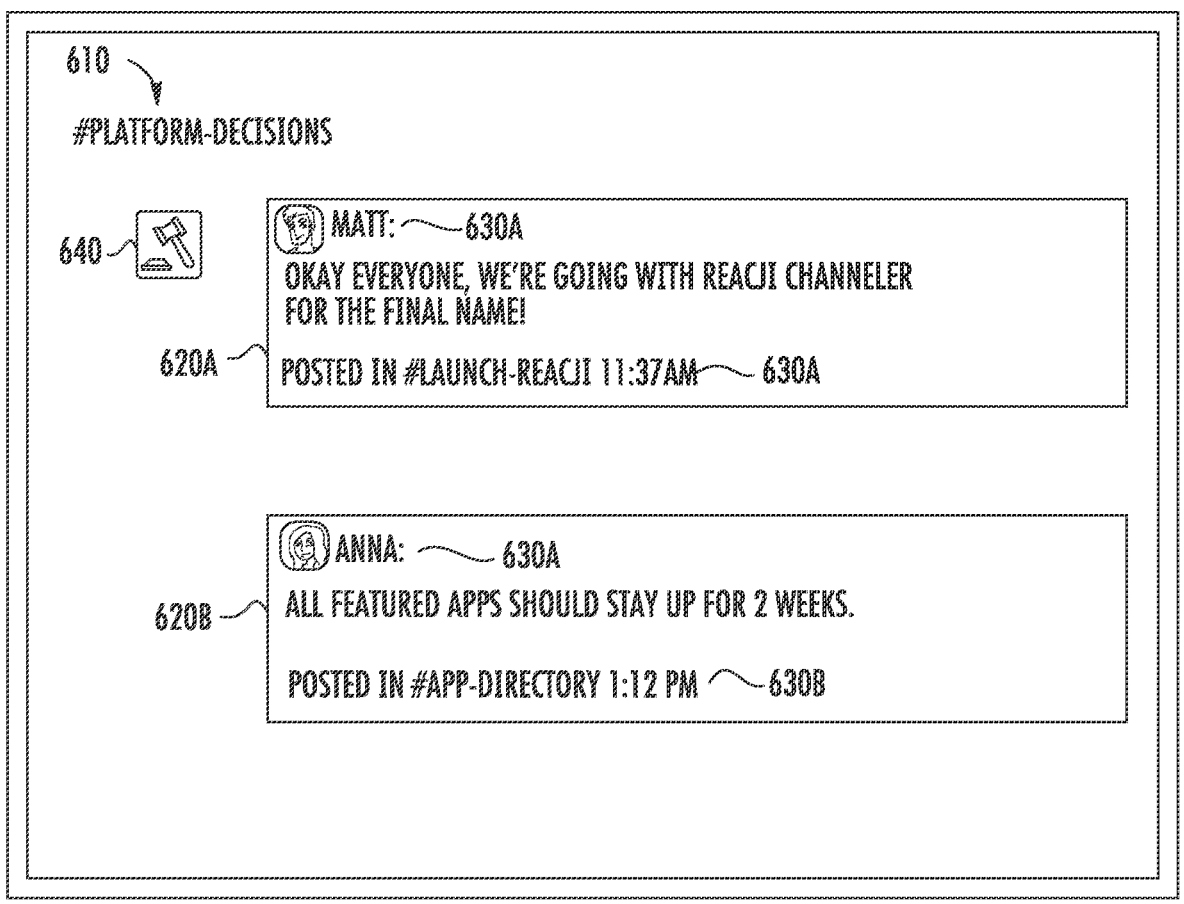
FIG. 6 illustrates an example group-based communication interface having channeled copies of group-based messaging communications in a receiver channel in accordance with some embodiments discussed herein.

If the graphical identifier is associated with at least one receiver channel through a channeling association, then, as shown in FIG. 6, the messaging communication with the graphical identifier may then be reproduced in the respective receiver channel. For instance, if the group-based communication interface 500 has received a channeling association configured to associate the graphical identifier 540 with a receiver channel, then the circuitry 200 will reproduce the messaging communication in the applicable receiver channel. If the group-based communication interface 500 has not received a channeling association configured to associate the graphical identifier 540 with a receiver channel, then the circuitry 200 will not reproduce the messaging communication in the applicable receiver channel. The messaging communication will simply be displayed in the group-based communication channel in which it was received. In some embodiments, a single graphical identifier may be associated with more than one receiver channel. A messaging communication including such graphical identifier would then be reproduced in each receiver channel associated with the graphical identifier. Accordingly, the selected group-based communication interface can be adapted or modified to most efficiently and effectively suit the needs of the select group. Channeling associations received in other group-based communication interfaces have no influence on the selected group-based communication interface.

FIG. 6 illustrates an example selected group-based communication interface 600 structured in accordance with various embodiments of the invention, specifically including a receiver channel 601. The receiver channel 601 includes multiple channeled copies 620A-620B of group-based messaging communications, each including messaging communication information 630A-630B. The messaging communication information 630A-630B includes a user identifier, the time of receipt of the respective group-based messaging communication, and the selected group-based communication channel in which the respective group-based messaging communication was first received. The receiver channel 601 also shows the name of the receiver channel 610 and may include other identifying information for the receiver channel 601 (e.g., date of creation, time of last messaging communication, users of communication channel, etc.).

In the embodiment illustrated in FIG. 6, the receiver channel 601 shows the graphical identifier 640 associated with the channel. The graphical identifier 640 is shown as an image of a gavel, but can be any suitable image or visual object including animated object. In the embodiment illustrated in FIG. 6, the selected group-based communication interface 600 received a channeling association associating the graphical identifier 640 with the receiver channel 601 ("platform-decisions"). Thus, the group-based messaging communication 520C of FIG. 5 was reproduced as a channeled copy 620A in the receiver channel 601 associated with the graphical identifier 540 (640 in FIG. 6). The channeled copy 620B is a reproduction of a group-based messaging communication from another group-based communication channel ("app-directory", which is not illustrated).

Figure 7:
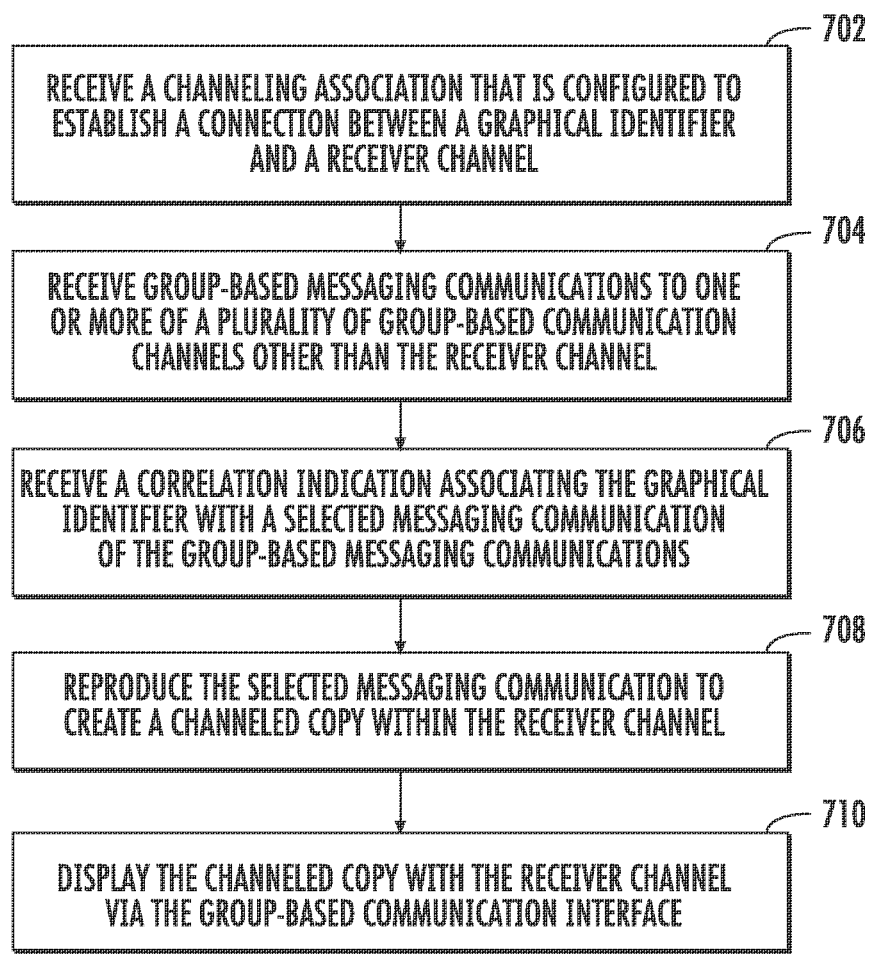
FIG. 7 illustrates a flow diagram of an example system in accordance with some embodiments discussed herein.

FIG. 7 illustrates a flow diagram of an example system in accordance with some embodiments discussed herein. The method 700 illustrated in FIG. 7 includes receiving a channeling association that is configured to establish a connection between a graphical identifier and a receiver channel 702; receiving group-based messaging communications to one or more of a plurality of group-based communication channels other than the receiver channel 704; receiving a correlation indication associating the graphical identifier with a selected messaging communication of the group-based messaging communications 706; and in response to receiving a correlation indication associating the graphical identifier with a selected group-based messaging communication 706, reproducing the selected messaging communication to create a channeled copy within the receiver channel 708. The method 700 further comprises displaying the channeled copy with the receiver channel via the group-based communication interface 710.

The selected group-based communication interface is configured to allow users of the interface to communicate within group-based communication channels and across group-based communication channels to provide relevant information to other users efficiently and effectively. The group-based communication interface is configured to allow a user to move between group-based communication channels. For instance, a user can search for specific group-based communication channels, highlight specific group-based communication channels to receive notifications or updates regarding messaging communications within the group-based communication channel, create specific group-based communication channels, and create a channel actuator to access specific group-based communication channels for easy access to the channels. As a group-based communication channel, receiver channels can be accessed by these methods as well. For instance, a user can search for specific receiver channels, highlight specific receiver channels to receive notifications or updates regarding messaging communications within the channel, create specific receiver channels, and create a channel actuator to access specific receiver channels for easy access to the channels. Thus, a receiver channel can be directly accessed by a user without first having to access another group-based communication channel.

A user can further access a group-based communication channel from a receiver channel. For instance, FIG. 10 illustrates a flow diagram of an example system in accordance with some embodiments discussed herein. The method 1000 is configured to allow a user to move from a receiver channel to another group-based communication channel. The user is thereby able to view the receiver channel, with compiled channeled copies, and then access the select group-based communication channel from which a specific channeled copy was made to gain additional context or information regarding the specific channeled copy, if desired. The method 1000 includes receiving a channeling request that is configured to move between one or more of the plurality of group-based communication channels after displaying the channeled copy with the receiver channel via the group-based communication interface 1002 and displaying one or more of the plurality of group-based communication channels via the group-based communication interface instead of displaying the receiver channel 1004, specifically displaying the desired group-based communication channel. The channeling request may be actuated by any suitable channel actuator (e.g., a button, switch, key, etc.) and initiates the channeling request to the circuitry 200 for processing. For instance, the channeling request may be actuated by a user selecting the name of the selected group-based communication channel shown as messaging communication information in the receiver channel.

Figure 8:
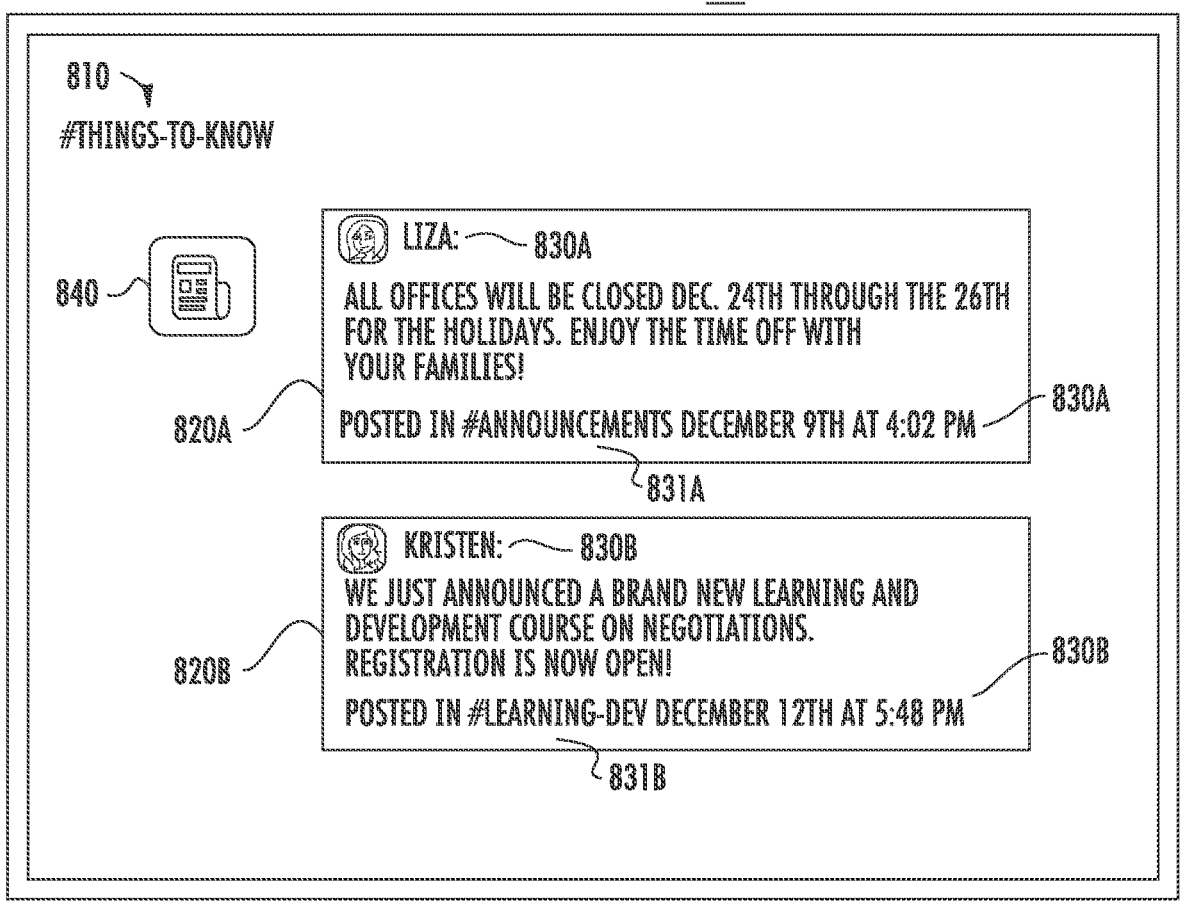
FIG. 8 illustrates an example group-based communication interface having channeled copies of group-based messaging communications in a receiver channel in accordance with some embodiments discussed herein.

FIG. 8 illustrates an example selected group-based communication interface 800 structured in accordance with various embodiments of the invention, specifically including a receiver channel 801. The receiver channel 801 includes multiple channeled copies 820A-820B of group-based messaging communications, each including messaging communication information 830A-830B. The messaging communication information 830A-830B includes a user identifier, the time and date of receipt of the respective group-based messaging communication, and the selected group-based communication channel in which the respective group-based messaging communication was first received. The receiver channel 801 also shows the name of the receiver channel 810 and may include other identifying information for the receiver channel 801 (e.g., date of creation, time of last messaging communication, users of communication channel, etc.).

Figure 9:
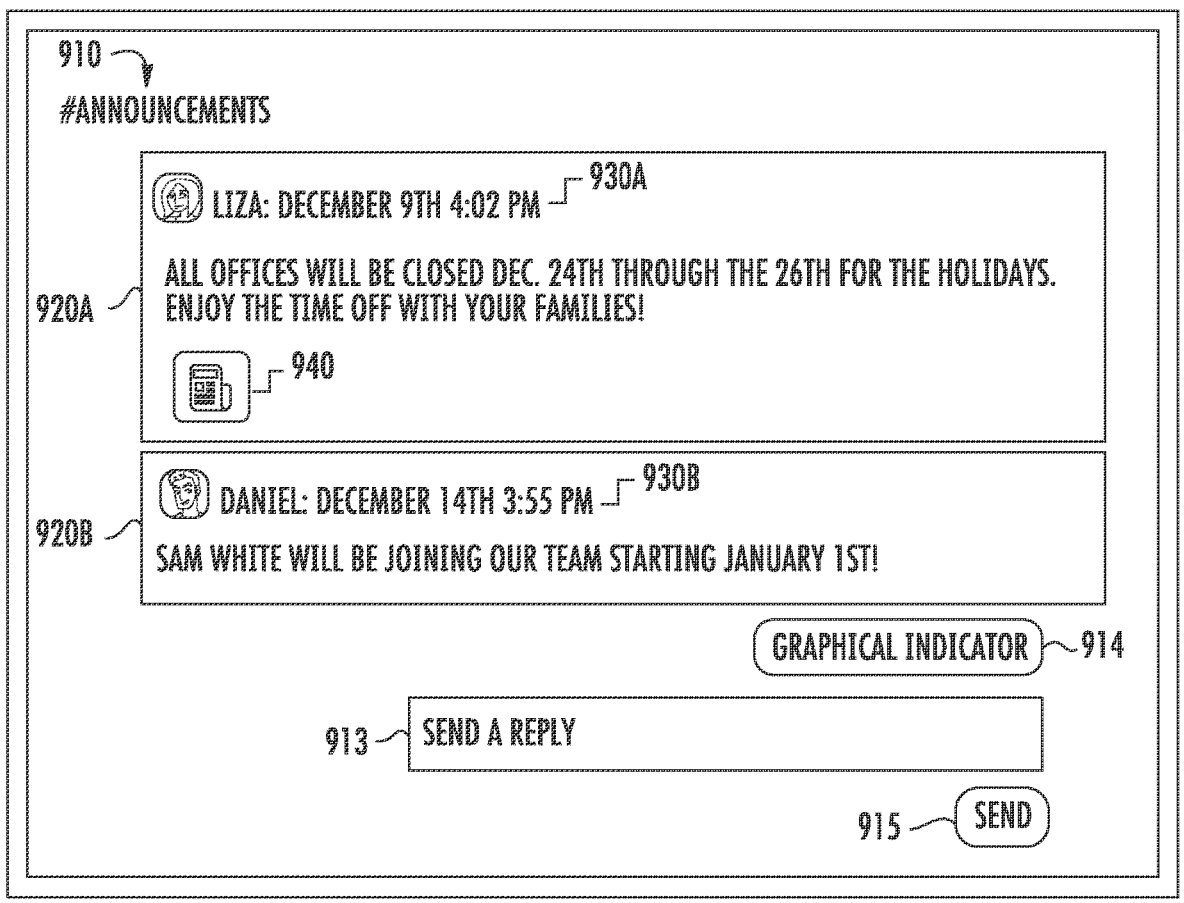
FIG. 9 illustrates an example group-based communication interface having group-based messaging communications in a group-based communication channel other than a receiver channel in accordance with some embodiments discussed herein.

In the embodiment illustrated in FIG. 8, the receiver channel 801 shows the graphical identifier 840 associated with the channel. The graphical identifier 840 is shown as an image of a newspaper, but can be any suitable image or visual object including animated object. In the embodiment illustrated in FIG. 8, the selected group-based communication interface 800 received a channeling association associating the graphical identifier 840 with the receiver channel 801 ("things-to-know"). Thus, the group-based messaging communication including the graphical identifier 840 was reproduced as channeled copies 820A, 840B in the receiver channel 801 associated with the graphical identifier 840. FIG. 9 illustrates the group-based communication interface in which channeled copy 820A was first received ("announcements"). The channeled copy 820B is a reproduction of a group-based messaging communication from another group-based communication channel ("learning-dev", which is not illustrated).

As noted above, the receiver channel 801 of FIG. 8 includes messaging communication information 830A-830B with each respective channeled copy 820A-820B. In the embodiment illustrated in FIG. 8, the names of the selected group-based communication channels in which the respective group-based messaging communications were first received are included in the messaging communication information 830A-830B and are channel actuators 831A, 831B for accessing the selected group-based communication channels. A user may select the name of the selected group-based communication channel, thereby initiating a channeling request to the circuitry 200 for processing. The circuitry 200 may then initiate the generation and display of the selected group-based communication channel on the group-based communication interface.

For instance, the channel actuator 831A may be selected, initiating a channeling request configured to view the group-based communication channel "announcements." As shown in FIG. 9, the group-based communication interface may then display the group-based communication channel "announcements." The channel actuator 831B may instead be selected, initiating a channeling request configured to view the group-based communication channel "learning-dev."

FIG. 9 illustrates an example selected group-based communication interface 900 structured in accordance with various embodiments of the invention, specifically including a selected group-based communication channel 901. As noted above, FIG. 9 illustrates the group-based communication channel ("announcements") in which the group-based messaging communication 920A was first received and then reproduced in receiver channel 801 as channeled copy 820A. A graphical identifier was not received in the group-based messaging communication 920B, and thus, the group-based messaging communication 920B is not reproduced as a channeled copy in a receiver channel.

The group-based communication channel 901 includes multiple group-based messaging communications 920A-920B, each including messaging communication information 930A-930B. The messaging communication information 930A-930B includes a user identifier and the time and date of receipt of the respective group-based messaging communication. The group-based communication channel 901 also shows the name of the channel 910 and may include other identifying information for the group-based communication channel 901 (e.g., date of creation, time of last messaging communication, users of communication channel, etc.).

As shown in FIG. 9, group-based messaging communication 920A includes a graphical identifier 940. The graphical identifier 940 is shown as an image of a newspaper, but can be any suitable image or visual object including animated object. As also shown in FIG. 9, in this embodiment, a messaging communication input area 913 is provided in the group-based communication channel 901 where users can input group-based messaging communications (such as 920A-920B). The group-based communication interface 900 includes a messaging actuator 915 (e.g., a button) that the user can select to enter the messaging communication in the messaging communication input area 913. The group-based communication interface 900 also includes a graphical identifier actuator 914. The graphical identifier actuator 914 allows a user to associate a graphical identifier (such as the graphical identifier 940) with a messaging communication. The messaging actuator 915 initiates transmission of the messaging communication with the graphical identifier, providing a correlation indication to the circuitry 200 for processing. The messaging communication with the graphical identifier is then displayed in the group-based communication channel 901 (as shown in group-based messaging communication 920A).

In some embodiments, users of a group-based communication channel may add graphical identifiers to an already received messaging communication. The user may want to react to the messaging communication using a graphical identifier without adding additional content to the messaging communication. For instance, referring back to FIG. 5, the group-based communication channel 501 includes a reaction actuator 550 that a user can select. The reaction actuator 550 initiates a correlation indication similar to that which the graphical identifier actuator 514 initiates. The circuitry 200 processes the correlation indication to determine if the messaging communication (e.g., group-based messaging communication 520C) has already been reproduced in the respective receiver channel. If it has been reproduced (such as shown in FIG. 6 as channeled copy 620A), then an additional channeled copy of the messaging communication (e.g., group-based messaging communication 520C) is not made. If the messaging communication has not been reproduced, then a channeled copy of the messaging communication is made in the receiver channel. In the embodiment illustrated in FIG. 5, the reaction actuator 550 indicates that two correlation indications have been received with regards to the group-based messaging communication 520C. However, as shown in FIG. 6, the receiver channel 601 only includes one channeled copy 620A of group-based messaging communication 520C. In addition, the messaging communication information 630A is indicative of the original group-based messaging communication 520C and not updated to show the receipt of the second correlation indication actuated by the reaction actuator 550.

Figure 11:
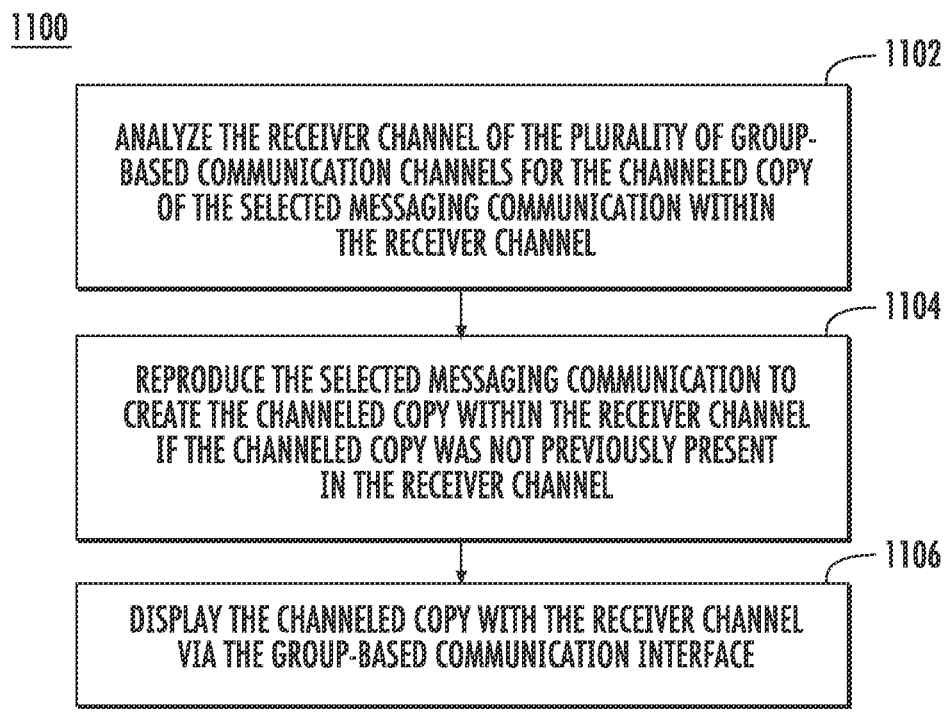
FIG. 11 illustrates a flow diagram of an example system in accordance with some embodiments discussed herein.

FIG. 11 illustrates a flow diagram of an example system in accordance with some embodiments discussed herein. In particular, FIG. 11 illustrates a method of analyzing a receiver channel after receipt of a correlation indication, such as a correlation indication of method 700 of FIG. 7 or a correlation indication initiated in response to a reaction actuator (e.g., 550 of FIG. 5). The method 1100 includes analyzing the receiver channel of the plurality of group-based communication channels for the channeled copy of the selected messaging communication within the receiver channel 1102 and reproducing the selected messaging communication to create the channeled copy within the receiver channel if the channeled copy was not previously present in the receiver channel 1104. The method 1100 may also include displaying the channeled copy with the receiver channel via the group-based communication interface 1106.

Figure 12:
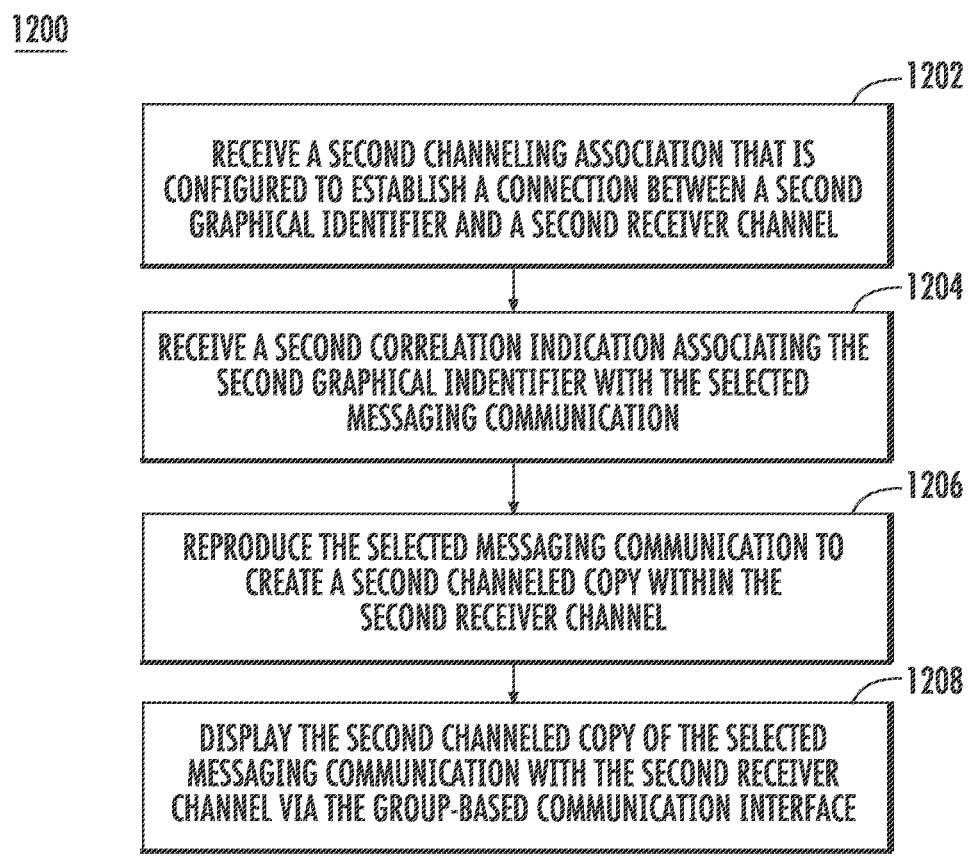
FIG. 12 illustrates a flow diagram of an example system in accordance with some embodiments discussed herein.

In some embodiments, more than one channeling association may be received. For instance, additional channeling associations may be received to more efficiently and effectively provide relevant information to other users across group-based communication channels. The additional channeling associations may be used to reproduce messaging communications to more than one receiver channel. For instance, a selected messaging communication can include more than one graphical identifier (e.g., two or more different graphical identifiers) thereby associating the selected messaging communication to more than one receiver channel. FIG. 12 illustrates a flow diagram of an example system in accordance with some embodiments discussed herein. The method 1200 includes receiving a second channeling association that is configured to establish a connection between a second graphical identifier and a second receiver channel 1202, receiving a second correlation indication associating the second graphical identifier with the selected messaging communication 1204, reproducing the selected messaging communication to create a second channeled copy within the second receiver channel 1206, and displaying the second channeled copy of the second selected messaging communication with the second receiver channel via the group-based communication interface 1208.

Figure 13:
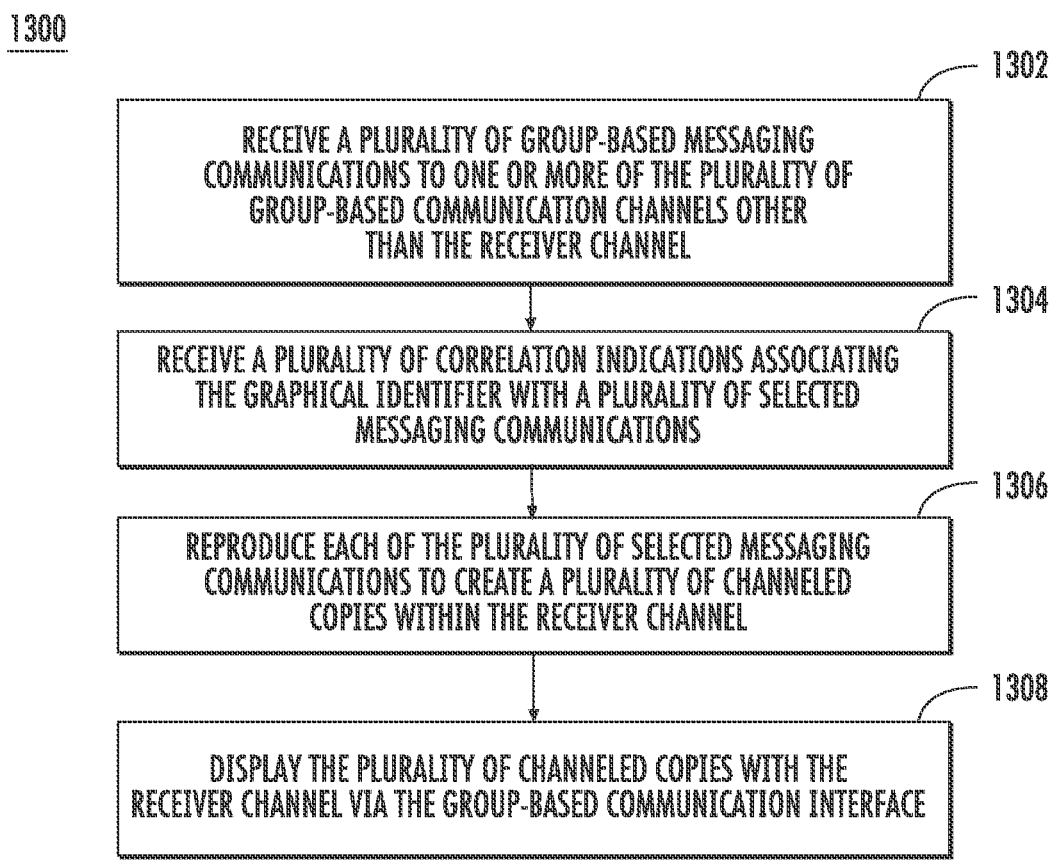
FIG. 13 illustrates a flow diagram of an example system in accordance with some embodiments discussed herein.

Furthermore, a plurality of group-based messaging communications can be received in the plurality of group-based communication channels of the select group-based communication interface. Each of the plurality of group-based messaging communications can include graphical identifiers to associate the group-based messaging communications to a plurality of receiver channels. FIG. 13 illustrates a flow diagram of an example system in accordance with some embodiments discussed herein. In particular, FIG. 13 illustrates a method 1300 involving the receipt of a plurality of group-based messaging communications and receiving a plurality of correlation indications associating a graphical identifier with the plurality of group-based messaging communications. Each of the group-based messaging communications is reproduced as a channeled copy in the receiver channel associated with the graphical identifier. The method 1300 includes receiving a plurality of group-based messaging communications to one or more of the plurality of group-based communication channels other than the receiver channel 1302 and receiving a plurality of correlation indications associating the graphical identifier with a plurality of selected messaging communications 1304. The method 1300 further includes reproducing each of the plurality of selected messaging communications to create a plurality of channeled copies within the receiver channel 1306, and displaying the plurality of channeled copies with the receiver channel via the group-based communication interface 1308.

Figure 14:
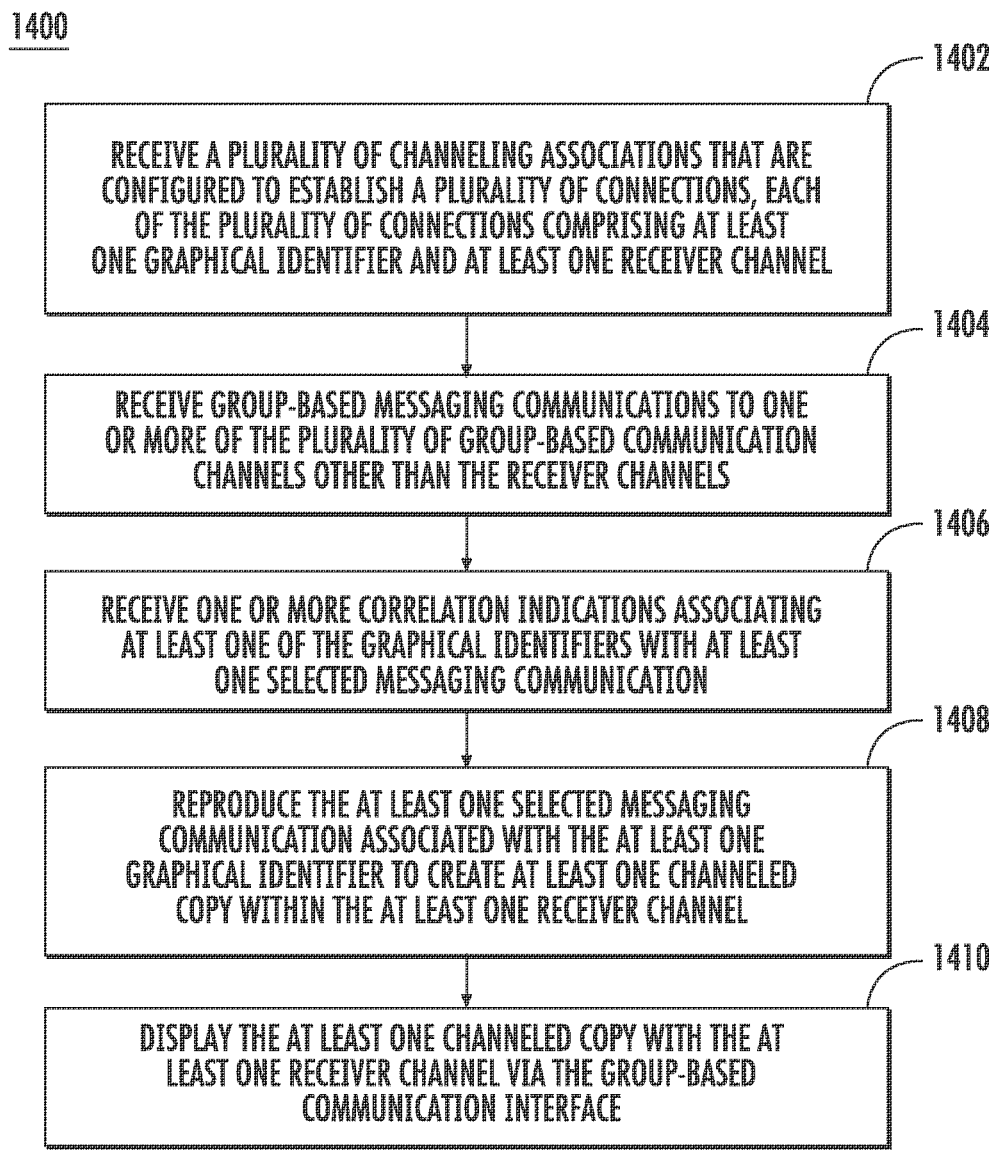
FIG. 14 illustrates a flow diagram of an example system in accordance with some embodiments discussed herein.

In some embodiments, a plurality of channeling associations may be received in a select group-based communication interface. Group-based messaging communications across the plurality of group-based communication channels can thereby be channeled to specific receiver channels providing relevant information to users of the group-based communication interface without the users needing to be a part of each group-based communication channel. For instance, FIG. 14 illustrates a flow diagram of an example system in accordance with some embodiments discussed herein. The method 1400 includes receiving a plurality of channeling associations that are configured to establish a plurality of connections, each of the plurality of connections comprising at least one graphical identifier and at least one receiver channel 1402, receiving group-based messaging communications to one or more of the plurality of group-based communication channels other than the receiver channels 1404, receiving one or more correlation indications associating at least one of the graphical identifiers with at least one selected messaging communication 1406, and in response to receiving one or more correlation indications associating at least one of the graphical identifiers with at least one selected messaging communication, reproducing the at least one selected messaging communication associated with the at least one graphical identifier to create at least one channeled copy within the at least one receiver 1408. The method 1400 further includes displaying the at least one channeled copy with the at least one receiver channel via the group-based communication interface 1410.

Some embodiments of the present invention also use a second screen, as discussed herein. For instance, a first screen may be presented to a first user while a second screen may be presented to a second user of the group-based communication interface. The format of a group-based communication channel may appear differently to different users of the channel; however, the content of the group-based communication channel (i.e., messaging communications) will be displayed to each user of the channel. For instance, users or groups may have particular preference for layouts or text fonts. The particular preferences may be considered when generating the group-based communication channels. The system may utilize any number of screens necessary to present the group-based communication interface in a meaningful way to each user of the interface.

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An apparatus comprising at least one processor and memory associated with the at least one processor, the memory comprising instructions that are executable by the at least one processor to cause the apparatus to:
   receive, from a user of a group-based communication system, a selection of a graphical identifier and a messaging communication associated with a first group-based communication channel identifier of a first group-based communication channel; and
   in response to the selection, generate a copy of the messaging communication for display in a second group-based communication channel associated with the graphical identifier, wherein the copy of the messaging communication is associated with a second group-based communication channel identifier of the second group-based communication channel.

2. The apparatus of claim 1, wherein the instructions are further executable by the at least one processor to cause the apparatus to:
   display the copy of the messaging communication in the second group-based communication channel.

3. The apparatus of claim 1, wherein the instructions are further executable by the at least one processor to cause the apparatus to:
   receive a request to move between the first group-based communication channel and the second group-based communication channel after displaying the copy of the messaging communication in the second group-based communication channel; and
   in response to the request, render the first group-based communication channel instead of the second group-based communication channel.

4. The apparatus of claim 1, wherein the graphical identifier is animated to illustrate movement between a first state and a second state through a series of images when rendered.

5. The apparatus of claim 1, wherein the instructions are further executable by the at least one processor to cause the apparatus to:
   prior to receiving a first user input associated with the first group-based communication channel of the group-based communication system, receive a second user input associating the graphical identifier with the messaging communication; and
   forego associating the messaging communication with the first group-based communication channel identifier in response to the second user input.

6. The apparatus of claim 1, wherein the instructions are further executable by the at least one processor to cause the apparatus to:
   display the copy of the messaging communication in the second group-based communication channel if the messaging communication was not previously associated with the second group-based communication channel identifier.

7. The apparatus of claim 1, wherein the instructions are further executable by the at least one processor to cause the apparatus to:
   receive a plurality of group-based messaging communications in a plurality of group-based communication channels other than the second group-based communication channel;
   receive a plurality of inputs associating the graphical identifier with the plurality of group-based messaging communications; and
   in response to receiving the plurality of inputs, generate copies of the plurality of group-based messaging communications for display in the second group-based communication channel.

8. A method comprising:
   receiving, from a user of a group-based communication system, a selection of a graphical identifier and a messaging communication associated with a first group-based communication channel identifier of a first group-based communication channel; and
   in response to the selection, generating a copy of the messaging communication for display in a second group-based communication channel associated with the graphical identifier, wherein the copy of the messaging communication is associated with a second group-based communication channel identifier of the second group-based communication channel.

9. The method of claim 8, further comprising:
   displaying the copy of the messaging communication in the second group-based communication channel.

10. The method of claim 8, further comprising:
    receiving a request to move between the first group-based communication channel and the second group-based communication channel after displaying the copy of the messaging communication in the second group-based communication channel; and
    in response to the request, rendering the first group-based communication channel instead of the second group-based communication channel.

11. The method of claim 8, further comprising:
    prior to receiving a first user input associated with the first group-based communication channel of the group-based communication system, receiving a second user input associating the graphical identifier with the messaging communication; and
    foregoing associating the messaging communication with the first group-based communication channel identifier in response to receiving the second user input.

12. The method of claim 8, further comprising:
    displaying the messaging communication in the second group-based communication channel if the messaging communication was not previously associated with the second group-based communication channel identifier.

13. The method of claim 8, further comprising:
    receiving a plurality of group-based messaging communications in a plurality of group-based communication channels other than the first group-based communication channel;
    detecting a plurality of user inputs associating the graphical identifier with the plurality of group-based messaging communications; and
    in response to detecting the plurality of user inputs, displaying the plurality of group-based messaging communications in the second group-based communication channel.

14. A non-transitory computer-readable storage medium storing instructions that are executable by one or more processors to:
    receive, from a user of a group-based communication system, a selection of a graphical identifier and a messaging communication associated with a first group-based communication channel identifier of a first group-based communication channel; and in response to the selection, generate a copy of the messaging communication for display in a second group-based communication channel associated with the graphical identifier, wherein the copy of the messaging communication is associated with a second group-based communication channel identifier of the second group-based communication channel.

15. The non-transitory computer-readable storage medium of claim 14, wherein the instructions are further executable by the one or more processors to:

display the messaging communication in the second group-based communication channel.

16. The non-transitory computer-readable storage medium of claim 15, wherein the instructions are further executable by the one or more processors to:

receive a plurality of group-based messaging communications in a plurality of group-based communication channels other than the second group-based communication channel;

receive a plurality of inputs associating the graphical identifier with the plurality of group-based messaging communications; and in response to receiving the plurality of inputs, generate copies of the plurality of group-based messaging communications for display in the second group-based communication channel.

17. The non-transitory computer-readable storage medium of claim 14, wherein the instructions are further executable by the one or more processors to:

receive a request to move between the first group-based communication channel and the second group-based communication channel after displaying the copy of the messaging communication in the second group-based communication channel; and in response to the request, render the first group-based communication channel instead of the second group-based communication channel.

18. The non-transitory computer-readable storage medium of claim 14, wherein the graphical identifier is animated to illustrate movement between a first state and a second state through a series of images when rendered.

19. The non-transitory computer-readable storage medium of claim 14, wherein the instructions are further executable by the one or more processors to:

prior to receiving a first user input associated with the first group-based communication channel of the group-based communication system, receive a second user input associating the graphical identifier with the messaging communication; and forego associating the messaging communication with the first group-based communication channel identifier in response to the second user input.

20. The non-transitory computer-readable storage medium of claim 14, wherein the instructions are further executable by the one or more processors to:

display the copy of the messaging communication in the second group-based communication channel if the messaging communication was not previously associated with the second group-based communication channel identifier.

* * * * *